United States Patent [19]

Jones

[11] Patent Number: 4,865,273

[45] Date of Patent: Sep. 12, 1989

[54] PARACHUTE-RELEASE MECHANISM AND METHOD

[76] Inventor: Leon Jones, 16331 Rhone Ln., Huntington Beach, Calif. 92647

[21] Appl. No.: 181,205

[22] Filed: Apr. 13, 1988

[51] Int. Cl.$^4$ .............................................. B64D 17/56
[52] U.S. Cl. ..................................... 244/149; 244/150
[58] Field of Search ............... 244/149, 150, 151 B; 73/384, 386, 387

[56] References Cited

U.S. PATENT DOCUMENTS

| | | | |
|---|---|---|---|
| 1,800,575 | 4/1931 | Tofflemire | 244/150 |
| 1,944,795 | 1/1934 | Lafayette | 244/21 |
| 2,353,440 | 7/1944 | Bresee | 244/150 |
| 2,505,869 | 5/1950 | Quilter | 244/150 |
| 2,584,164 | 2/1952 | Stallan | 244/150 |
| 2,676,655 | 4/1954 | Hatfield | 161/1 |
| 2,697,147 | 12/1954 | Harland | 200/83 |
| 2,743,891 | 5/1956 | Gaylord | 244/150 |
| 2,833,498 | 5/1958 | Colt | 244/150 |
| 2,923,160 | 2/1960 | Ault | 74/2 |
| 2,937,831 | 5/1960 | Mayo et al. | 244/149 |
| 2,960,297 | 11/1960 | Cotter et al. | 244/150 |
| 3,013,834 | 12/1961 | Minicucci, Jr. | 294/83 |
| 3,142,958 | 8/1964 | Roberts et al. | 60/26.1 |
| 3,291,424 | 12/1966 | Hatfield et al. | 244/149 |
| 3,468,502 | 9/1969 | Kinney | 244/150 |
| 3,547,383 | 12/1970 | Carpenter, Jr. | 244/150 |
| 3,690,605 | 9/1972 | Jones | 244/149 |
| 3,787,011 | 1/1974 | Phillips et al. | 244/150 |
| 3,813,066 | 5/1974 | Raznov | 244/150 |
| 4,279,392 | 7/1981 | Saxton | 244/150 |

FOREIGN PATENT DOCUMENTS 609000  4/1928  United Kingdom .
278695  9/1948  United Kingdom .

OTHER PUBLICATIONS

Parachutist Magazine, Nov. 1969, p. 25.
Parachutist Magazine, Mar. 1971, pp. 18 and 19.
Para-Gear Equipment Company, 1968 Mini-Catalog, p. 3.

Primary Examiner—Sherman D. Basinger
Assistant Examiner—Rodney Corl
Attorney, Agent, or Firm—Richard L. Gausewitz

[57] ABSTRACT

A parachute deployment actuator incorporating an aneroid with a relatively long strike results in a significant diminution in the degree of precision with which the associated parts have to be made. A spring is provided externally of the aneroid in such relationship as to augment the natural spring force tending to expand the aneroid, such spring operating not only to keep the aneroid off its internal stop at sea level but also to cause the overall system to have a desired spring rate. A variable lever system inter-relates a preprinted scale and associated altitude cam with the aneroid in such relationship that the parachute actuator will release the chute very near a pre-set altitude.

64 Claims, 9 Drawing Sheets

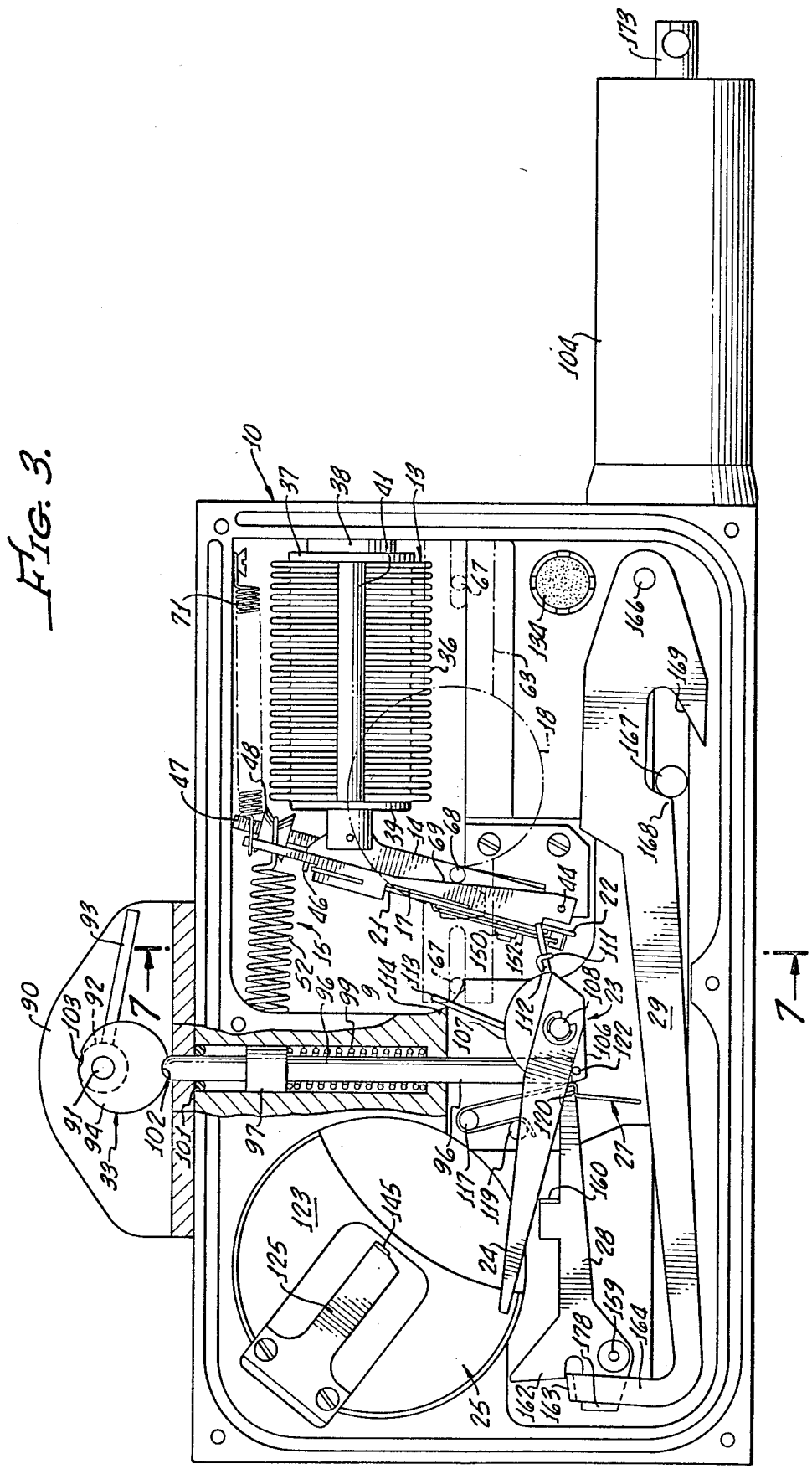

PARACHUTE-RELEASE MECHANISM AND METHOD

BACKGROUND OF THE INVENTION

Parachute actuating mechanisms for military (and sport) applications have incredibly exacting requirements. They must be such as to release very large spring forces—needed to pull the rip cord—in response to very light actuating forces. They must be contained in a very small "package" or housing, as specified by the military and in order to minimize bulk and weight to thus aid the military or sport parachutist. They must be such as to open near a desired "set" altitude, the nearer the better. They must be so constructed that a pre-printed altitude-indicating scale can be used, it being impractical in production to have all of the altitude settings on every dial for every parachute actuator specifically calibrated for that actuator.

There are many other severe requirements for parachute actuators, including (for example) the requirement that the actuator be able to be re-fired many times without deviating from its settings and operability. A further important consideration relates to manufacturing cost. One especially troublesome requirement has been what is called the drop test.

It is of late a military requirement that the actuator be able to be dropped three feet onto a two inch thick block of steel, without being broken or having its settings and characteristics changed. Attempts to meet this drop test, s especially or a reliable mechanism in a small package, have caused many problems in the industry. This is not to imply, however, that attempts to meet others of the above-stated requirements have not caused extremely severe problems.

In my co-pending patent application Ser. No. 96,679, filed Sept. 14, 1987, for a Parachute Release Apparatus (which is a continuation of application Ser. No. 770,401, filed Aug. 28, 1985), now Pat. No. 4,783,027, there is described a parachute-release apparatus of the type in which a timer is employed in conjunction with aneroid and other mechanisms, to cause opening of the parachute a predetermined number of seconds (or milliseconds) after the device drops through a pre-set altitude. The mechanism described in such patent application is believed by applicant to be highly satisfactory in all regards excepting those relating to the aneroid and the aneroid-compensating system. For example, the aneroid compensation means described in such application required that all aneroids in a given production batch be—in effect—brought down in performance to a "worst case" condition. Such worst case was that of the least-satisfactory aneroid in the batch. As another example, the aneroid described in such patent application had but a small amount of travel, and this necessitated extreme precision in associated parts and consequent problems vis-a-vis accuracy and repeatability, especially after the above-mentioned drop test was performed.

Referring now to a different aspect of parachute-release mechanisms and methods, it is common for the person using the parachute to pull a pin in order to arm the mechanism, and to insert the pin in order to cock the mechanism. This, while necessary in some applications, has problems in many others. For example, one problem relates to what the parachutist does with the pin after he or she pulls it. In actual life, the pins frequently become lost. Another problem is that the pulling of the pin leaves a hole in the mechanism, through which dust, dirt and grit can enter. The entrance of such foreign materials can interfere with future operations of the mechanism.

Referring next to another aspect of parachute-actuator mechanisms, there is one type in which the parachute does not open unless the parachutist is falling at a relatively high rate of speed. These mechanisms are employed on reserve chutes, since that it would be inconvenient and very likely disastrous for a reserve chute to open when the main chute has already been deployed. It has been difficult to achieve a highly reliable, yet relatively simple and economical, mechanism of this type.

SUMMARY OF THE INVENTION

In view of the above and various other factors relating to different types of parachute actuators and methods, it will be understood that there is a great need—relative to both military and sport parachute actuators—for actuators that are compact, rugged, reliable, light, economical, etc., and will even meet the above-stated drop test, yet which are extremely sensitive and will effect opening of the chute very near the pre-set altitude, and which will operate repeatedly jump after jump without degradation of performance.

There is also a major need for a parachute actuator incorporating a rate-of-fall device that is very simple and economical yet will not let the chute deploy unless the parachutist is falling at a high rate of speed when he or she passes through the pre-set altitude.

There is also a distinct need for a parachute actuator cocking and arming mechanism that does not incorporate a pin that separates from the remainder of the mechanism, and that will not permit ingress of dirt, dust and grit into the mechanism.

There exists a great need for a parachute actuator incorporating an aneroid having a relatively long stroke, the result being a significant diminution in the degree of precision with which the associated parts have to be made and in the degree of susceptibility to shocks as in the drop test, yet which will cause the parachute to deploy at a point near a desired pre-set altitude, in combination with a compensating mechanism which makes it possible to use a pre-printed scale and makes it unnecessary to calibrate each actuator except vis-a-vis two calibration points (for example, 1,000 and 20,000 feet).

In accordance with one aspect of the present invention, a spring is provided externally of the aneroid in such relationship as to augment the natural spring force tending to expand the aneroid, such spring operating not only to keep the aneroid off its internal stop at sea level but also to cause the overall system to have a desired spring rate. Preferably, the aneroid is a relatively long bellows that—in and of itself—has a low spring rate.

In accordance with another aspect of the invention, means are provided to vary both the force exerted by the external spring, and also to vary a lever relationship by which the external spring is associated with the aneroid.

In accordance with further aspect of the invention, means are provided to interrelate a pre-printed scale and associated altitude cam with the aneroid, in such relationship that the parachute actuator will release the chute very near a pre-set altitude. The means comprises a variable lever system.

Relative to another aspect of the invention, an extremely simple, rugged and reliable rate-of-fall device is incorporated in the combination, and serves to prevent the parachute from being actuated unless the parachutist is dropping faster than a predetermined rate of fall when the pre-set altitude is reached.

An additional aspect is a system that cocks the parachute actuator a substantial time period before use, and that arms of the actuator just before use, without employing any removable pin and without creating any hole in the housing through which foreign particles can enter into the mechanism.

The invention relates to both apparatus and method.

BRIEF DESCRIPTION OF THE DRAWINGS

FIG. 3 is a top plan view of the parachute actuating device when in such cocked but not armed condition, the top cover being removed, the bellows being shown in section;

FIG. 4 is an enlarged fragmentary sectional view on line 4—4 of FIG. 1;

FIG. 5 is an isometric view illustrating schematically the relationship between the altitude cam and the parts immediately associated therewith;

FIG. 6 is an isometric view illustrating schematically the two levers and the trigger as associated with the bellows;

DETAILED DESCRIPTION OF THE PREFERRED EMBODIMENTS

Figure 1:
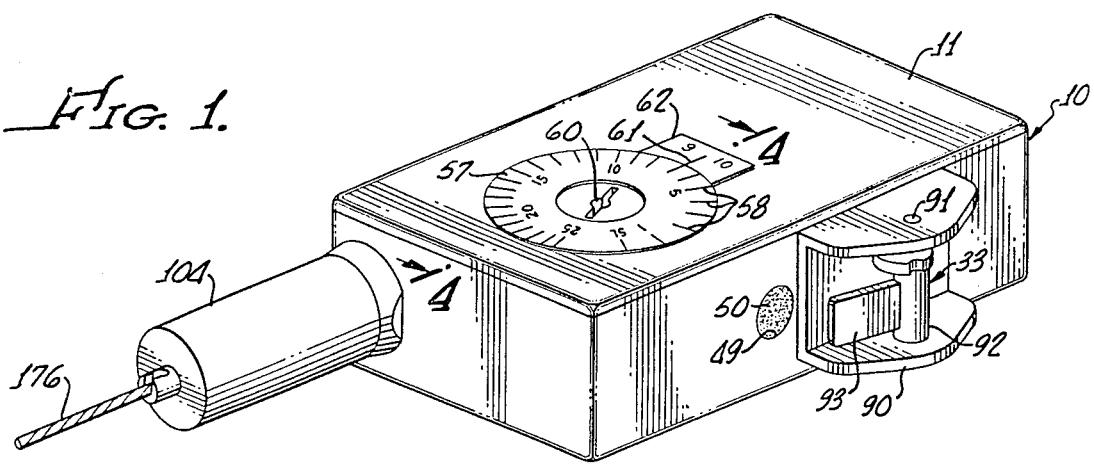
FIG. 1 is an isometric view illustrating the parachute actuator in cocked—but not armed—position.

In the present application, there will be described a parachute actuator incorporating a rate-of-fall sensing means that prevents release of the chute unless the rate of fall is sufficiently great. It is to be understood, however, that the present invention is also applicable to the type of parachute actuator incorporating timer means that delay opening of the chute until a predetermined time period after a mechanism falls to the pre-set altitude. Accordingly, there is hereby incorporated by reference into the present patent application the specification and drawings of my co-pending U.S. Pat. application Ser. No. 96,679, filed Sept. 14, 1987, for Parachute Release Apparatus, now Pat. No. 4,783,027 excepting those portions of said specification and drawings which comprise the aneroid, aneroid-compensation mechanism, and mechanism immediately associated with the aneroid.

In the present specification and claims, the word "bellows" denotes a conventional bellows. Such a conventional bellows, in the present art, is a device having a continuous wall that is, typically, serpentine in longitudinal section. The word "bellows" does not comprehend, in the present specification and claims, a capsule or series of capsules such as are illustrated in the above-referenced co-pending patent application (such capsules being, however, one type of "aneroid").

Overview

The present parachute actuator is illustrated as having a small housing or "package" 10, the size of which may be (for example) 5⅛×3×½ inches. Provided within housing 10 are various walls and chambers to contain the different mechanisms described below, and to create pressure differential effects described below. A top cover 11 and bottom cover 12 are mounted on opposite sides of housing 10, as by various screws (not shown).

An aneroid 13 (FIG. 2) is connected to a lever 14 (FIG. 6) and to a spring means 15. A trigger support arm 17 is mechanically associated with an altitude cam 18 (FIG. 5) by means of a mechanism 19.

Figure 2:
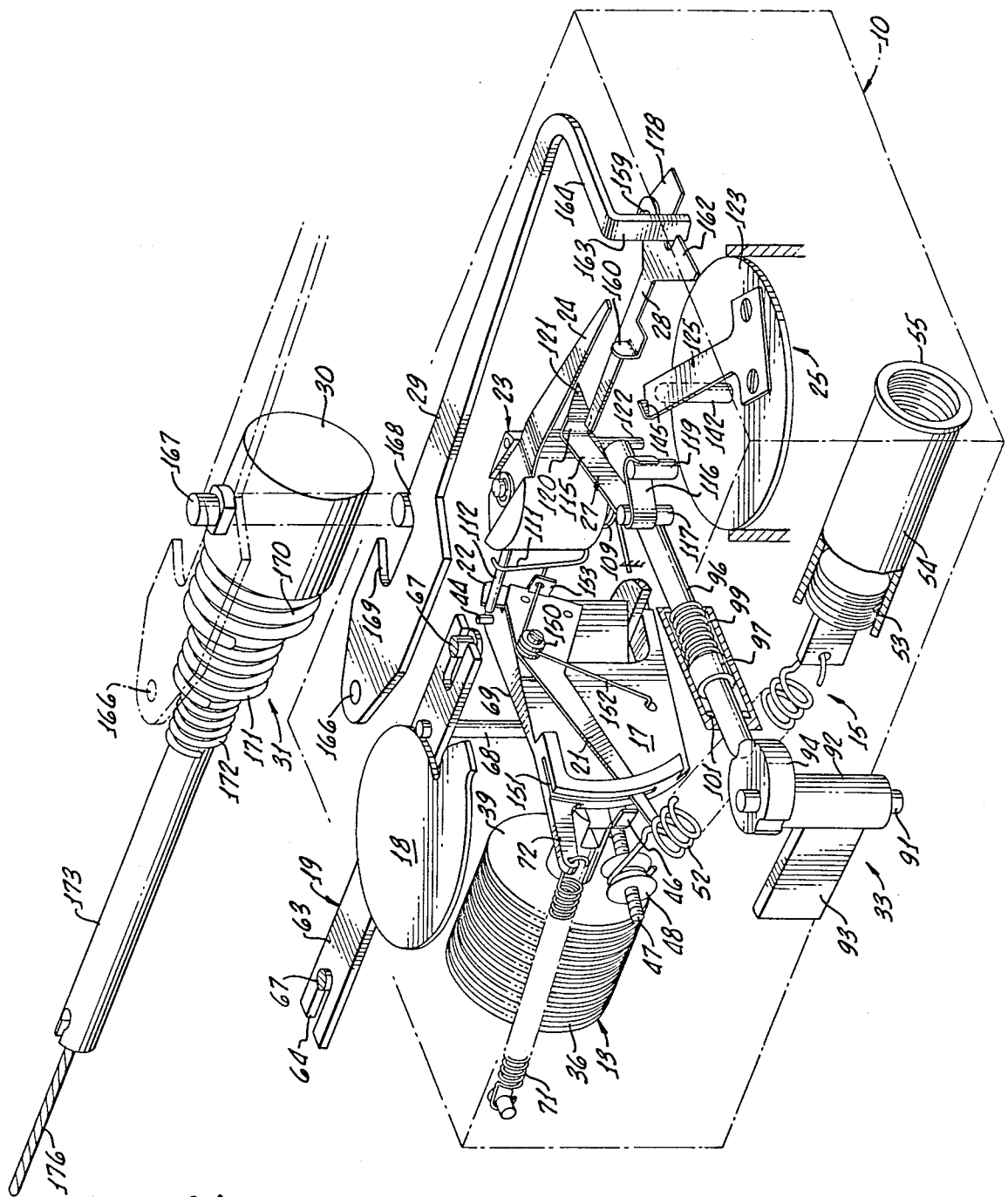
FIG. 2 is a schematic view illustrating diagrammatically various elements of the parachute actuating device when in such cocked (but not armed) condition.

Assuming that the parachute actuator is in armed condition, when a pre-set altitude is reached (during the fall) the aneroid 13 and associated mechanism effect release of a trigger 21 (FIG. 2). This, in turn, releases a latch 22, thereby releasing a pivot and cam element 23. The latter element then rotates under spring bias, to rotate a crank (or arm) 24 as far as permitted by a rate-of-fall mechanism 25.

If the actuator is dropping at a high rate of speed when the pre-set altitude is reached, which is the condition when the main chute has not opened, the rate-of-fall mechanism 25 permits crank 24 to pivot sufficiently far to release a catch lever or spring 27 (FIG. 2). A second latch 28 is thus released, which releases a main latch 29 and thus a piston 30 associated with the power-spring means 31. The rip cord is thereby pulled and the parachute deployed.

To cock the mechanism after the parachute actuator is on the ground, a mechanical switch mechanism 33 is operated. The same switch mechanism is operated to another position to arm the actuator when it is in the air above the pre-set altitude.

The Aneroid Mechanism, Including the Associated Aneroid Lever and Tension Soring Mechanism The aneroid 13 is very preferably, as shown in FIG. 3 and other figures, a bellows 36 formed of metal and having a wall that is serpentine in longitudinal cross-section. Such a bellows is substantially linear. In order to minimize the effects of temperature, bellows 36 is substantially evacuated. The bottom of the bellows (right end as viewed in FIG. 3) is fixedly mounted on a base 37 that, in turn, is secured by an external post 38 to one end wall of housing 10. The free end of the bellows (left end as viewed in FIG. 3) has a cap 39 thereon.

To prevent the bellows 36 from being compressed, at sea level, to an over stressed condition, due to the fact that the bellows has a substantial vacuum therein, a bellows-support post 41 is provided axially within the bellows (FIG. 3), being secured at its right end (FIG. 3) to base 37, and extending at its left end to a point close to the region where it is desired that the bellows cap 39 be located when the atmospheric pressure is that at sea level (and the bellows-spring combination has been fully calibrated).

In accordance with the present invention, the bellows 36 can have a very low spring rate and a very long stroke, thus creating a relatively high degree of change in the length of the bellows for a given change in altitude. The long stroke relationship permits the remaining parts of the parachute actuator to be manufactured with less precision than would otherwise be required and, furthermore, makes the apparatus more immune to shocks (as, for example, caused by dropping) than is the case with conventional bellows employed in parachute actuators.

Cap 39 of the bellows is pivotally connected, at a point along the bellows axis but externally of the bellows, to the aneroid (bellows) lever 14. The pivotal connection is illustrated at 42 is FIG. 6, being a small-diameter pin for minimized friction. The bellows lever 14 is a strongly-constructed beam having side flanges 43 (FIG. 6) adapted to cause the lever to be very rigid for its weight.

At its base end, the right end as viewed in FIG. 6, bellows lever 14 is pivotally connected to housing 10, by a pin, for rotation about an axis 44 that is preferably the same as the axis of pivotal movement of trigger support arm 17.

At a region relatively remote from axis 44 (and a pivot pin thereat), bellows lever 14 has a catch flange 46 (FIG. 6) that extends away from the bellows and is adapted to cooperate with the trigger 21 to prevent pivotal movement of the latter except when the parachute actuator is below the pre-set altitude.

The bellows lever 14 further comprises a threaded shaft 47 that is soldered or otherwise fixedly secured to the main body of bellows lever 14 at the distal end thereof, extending outwardly from such distal end substantially past catch flange 46.

Figure 7:
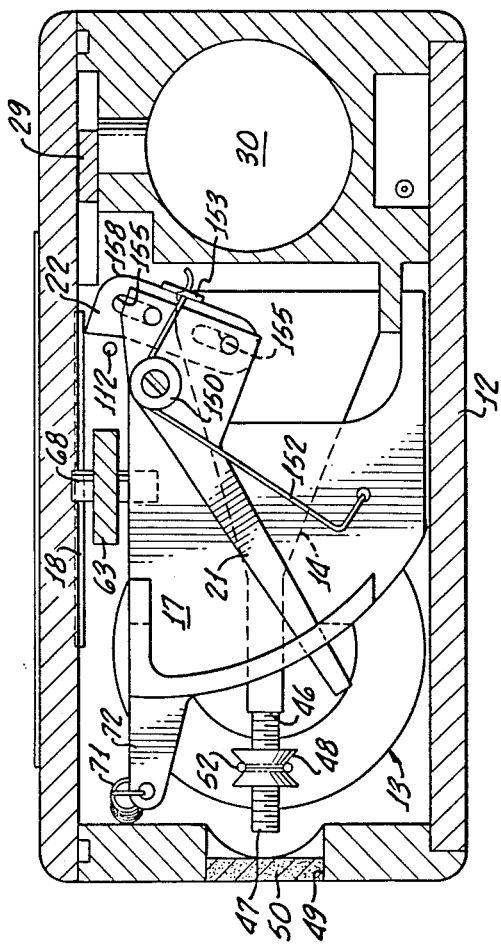
FIG. 7 is a transverse sectional view on line 7-7 of FIG. 3.

Rotatably mounted on shaft 47 is a thimble nut 48 the outer end of which is suitably slotted or otherwise shaped in order to permit rotation thereof by a screwdriver or similar device. A hole 49 (FIGS. 1 and 7) is provided in one side wall of housing 10, directly opposite the end of shaft 47, to permit introduction of a screwdriver for thimble nut adjustment. After such adjustment occurs at the factory, the hole 49 is suitably blocked as, for example, by a sintered metal filter 50 (FIGS. 1 and 7). Thimble nut 48 forms part of the spring means 15 previously referred to, in that it holds the inner end of an elongated helical tension spring 52 that extends in a direction away from the bellows 36 generally longitudinally of the bellows. The portion of spring 52 remote from nut 48 extends (as shown schematically in FIG. 2, and realistically in FIG. 8) to a cradle element 53. In passing to such cradle element, spring 52 extends through an opening or bore in a solid part of the housing 10.

Cradle element 53 is an externally threaded plug or nut that is threaded within an elongated internally-threaded sleeve 54 (FIGS. 1 and 8) having a flange 55 at the outer end thereof. Sleeve 54 and its flange 55 are rotatable in housing 10, about the longitudinal axis of the sleeve.

To adjust the tension of spring 52 at the factory, a special tool is inserted into sleeve 54 from the exterior of housing 10, the tool being adapted to grip cradle element 53 so that it may not rotate. Then, the sleeve is rotated so as to cause the cradle element to shift in either direction along the sleeve without effecting any twisting of spring 52. The flange 55 cooperates with a shoulder portion of the housing to prevent inward shifting of sleeve 54 in response to tension of spring 52.

In many prior-art bellows devices employed in parachute actuators, it was common to use an internal helical spring to add to the spring force created by he bellows itself, it being pointed out that bellows structures are very poor springs. Placing a helical spring within a bellows had several major disadvantages. For example, it is important—if the bellows is to operate at very low altitudes—that the bellows cap not contact the end of bellows post 41 (FIG. 3) at sea level.

Attempts to manufacture parachute-actuator bellows having internal helical springs, in such manner that the bellows post was adjacent the bellows cap at sea level, often met with failure due to such things as manufacturing tolerances, variations in bellows spring rate, etc. Then, when failure occurred, the bellows had to be discarded or (if possible) the entire spring-mounting process repeated. It is pointed out that one major reason why it is hard to manufacture bellows with internal springs is that the springs tend to over stress the bellows before it is evacuated, it being impractical to effect evacuation of the bellows prior to mounting of the spring.

Another important defect of parachute-actuator bellows containing internal springs is that the bellows stroke cannot practically be long while still maintaining linearity and minimized friction. If the bellows spring is long, which is necessary for a long bellows stroke, the spring tends to buckle in the center and rub on the internal regions of the bellows. This creates friction and non-linear movement.

A further major disadvantage of internal springs in the bellows of parachute actuators is that the end coils tend to touch each other when the bellows is substantially fully compressed, thus shorting-out such end coils. Then, when the bellows begins to expand, the end coils progressively unwind and create a distinctly non-linear relationship. This is because the spring rate of a spring all coils of which are not in contact with each other is substantially different from the spring rate of a spring having the end coils in contact (shorted out).

In accordance with one aspect of the present apparatus and method, on the other hand, all of the above-specified problems (and others) are eliminated. In order to move the bellows cap away from the internal stop, the external spring is tensioned until the cap starts to move. There is no difficulty of manufacture, and no danger of loss of a bellows. Furthermore, with an external tension spring all of the coils are always out of contact with each other, so none is shorted out and the result is linearity. With an external spring, the spring never rubs against the bellows to create friction and (worse) irregular movement.

With the present method and apparatus, there can be a high spring force (necessary to cause the spring cap to move away from the internal stop) while having a low spring rate (pounds per inch). With a low spring rate, there is a long travel of the bellows for a given change in atmospheric pressure. Such a long stroke is very desirable for reasons previously stated. The longer the tension spring, the lower the spring rate of that spring can be. The spring rate is limited only by the spring's available length.

Method of Matching the Spring Rate of the Aneroid System to the Dial and Scale Associated with the Altitude Cam When the parachute actuator is in armed condition, and is above a pre-set altitude, the catch flange 46 (FIG. 6) on aneroid lever 14 is adjacent, and holds, the trigger 21 that is supported by trigger support arm 17 (FIG. 6). Reference is also made to FIG. 2 (which, however, shows the trigger 21 spaced slightly away from catch flange 46 in that FIG. 2 shows the parts and positions assumed prior to arming of the actuator).

The trigger support arm 17 does not pivot once the altitude cam 18 has been shifted to a desired altitude setting. Accordingly, trigger 21 stays in the same plane during the entire jump. This means that the trigger 21 will be released s by catch flange 46 just as soon as the tip of catch flange 46 pivots away from the trigger 21 in response to collapsing of the bellows 36 as the ambient pressure increases during the fall.

As shown in FIGS. 1, 4 and 5, altitude cam 18 has connected thereto—by screws 56—a disc-shaped dial 57. Dial 57 has printed thereon (or adjacent thereto) a plurality of indicia 58 that form a scale indicating altitudes. (The scale could also be adjacent, but not on, the dial.) The indicia of the scale preferably indicate 1,000-foot increments, starting with sea level and ending with (for example) 25,000 feet. The scale on dial 57 is, preferably, logarithmic. It is important that the scales be pre-printed, and that—in production of the parachute actuators—everything be such that calibrating to only high and low points on the scale will cause everything else to fall in place. It is extremely impractical to calibrate every altitude for every individual parachute actuator.

Calibrating to only high and low points will cause the intermediate points to be correct because: (a) the bellows system is substantially linear, (b) altitude cam 18 is linear, in that equal increments of rotation cause equal cam strokes, and (c) scale 58 is regular and follows a certain function. The scale could be calibrated to indicate pounds per square inch absolute, and this would cause the scale to be linear. Preferably, however, the scale is marked in thousands of feet of altitude. Because of the characteristics of the atmosphere, this results in a logarithmic scale. (It is to be understood that points between the 1,000-foot marks of the scale may also be indicated.)

Dial 57 is rotated by a screwdriver inserted into a slot 60, which rotates the altitude cam 18 a corresponding amount. A desired altitude mark 58 on dial 57 is caused to register with a mark 61 (FIG. 1) on a fixed-position indicia element 62 z: that, like the dial 57 itself, is on top cover 11 of the actuator.

Instead of having only one mark 61 on element 62, there can be several marks thereon, each corresponding to a predetermined barometric pressure. Thus, 29.9 inches of mercury is indicated by "0.9", etc.

In accordance with the method and apparatus of one aspect of the present invention, an external spring tending to expand the aneroid is provided, and the spring rate of the aneroid system is caused to match the scale 58 on dial 57, so that only high-altitude and low-altitude adjustments need be made for each parachute actuator during production and then all of the rest of the altitudes will be correct.

The mechanism 19, described below, for associating trigger support arm 17 with altitude cam 18—and thus with dial 57—is such that each dial setting causes a corresponding pivoted position of trigger support arm 17 and accordingly of trigger 21. Thus, there is a predetermined relationship between the rotated position of dial 57 and the pivoted position of trigger support arm 17, for all settings of dial 57.

It is emphasized that each aneroid 13, which is very preferably a bellows 36, has a slightly different characteristic. The bellows areas vary slightly, as do the spring rates of the bellows.

In accordance with the present apparatus and method, there is provided a tensile spring force on the bellows that tends to expand the bellows, and that also adds to the spring rate of the bellows a variable spring rate. The relationship is such that the combination of the spring rate of the bellows, and the variable spring rate, make the indicia 58 on dial 57 correct at all altitudes.

By moving thimble nut 48 along threaded shaft 47, the apparent or effective spring rate created by the external tension spring 52 changes progressively. The exterior spring 52 has a constant spring rate. However, when the end of spring 52 is connected (for example) to the extreme outer end of aneroid lever 14, such external spring 52 adds a larger effective spring rate to the natural spring rate of aneroid 13, than is the case when spring 52 is connected to lever 14 at a region closer to the pivot axis (pin) 44 of lever 14.

Stated otherwise, as the spring end moves progressively along shaft 47 toward pivot 44, the effective spring rate that external tension spring 52 adds to the spring rate of the bellows becomes less and less, so that the overall spring rate of the bellows system becomes less and less. Conversely, movement of the thimble nut in the opposite direction creates a higher spring rate of the overall bellows system.

Prior to calibration, the bellows 36 is collapsed—on its internal stop post 41 (FIG. 3) by external air pressure corresponding to that at sea level. To stretch bellows 36 away from such internal stop, the tensile force created by spring 52 on the bellows is increased, by adjusting cradle nut 53 (FIG. 2), until the external spring tension—combined with the bellows spring force—overcome such external sea-level pressure and the bellows cap moves slightly away from the internal stop. The stated steps are performed while the device is in a test chamber having a pressure corresponding to that at sea level, as above indicated, and with the dial 57 set at sea level position (relative to indicia or scale 58).

When the bellows cap just barely clears stop 41 at sea level, the immunity of the bellows to impact shock is increased.

Then, dial 57 is set at 1,000 feet, and the test chamber pressure is set at 1,000 feet. Spring 52 is then adjusted by cradle element 53 to adjust the spring force until catch flange 6 just barely clears trigger 21 (just barely permits the trigger 21 to pivot).

Then, dial 57 is rotated to a high-altitude position, for example 20,000 feet. Because of operation of the mechanism 19 (FIG. 4) described below, such high-altitude setting of dial 57 causes the trigger support 17 to pivot away from aneroid 13. Then, the pressure in the test chamber is reduced to a low level, for example that corresponding to an altitude of 25,000 feet. The pressure in the test chamber is then progressively increased until catch flange 46 (FIG. 6) moves just below (toward bellows 36) trigger 21, so that trigger 21 can pivot. This point (altitude) is then measured; that is to say, the pressure in the test chamber is noted.

Let it be assumed, for purposes of illustration, that the trigger 21 pivoted at a bellows position corresponding to 22,000 feet, instead of the desired 20,000 feet. This means that the overall spring rate of the system is excessively high. Accordingly, thimble nut 48 is turned in such direction as to move closer to pivot axis or pin 44, thus decreasing the effective spring rate of the entire system. Stated in another manner, the amount of additional spring rate that is added by tension spring 52 is caused to be less than previously.

The cradle nut 53 is then again adjusted so that the trigger releases at 1,000 feet.

The above steps are then repeated until the overall spring rate and spring force are such that (a) trigger 21 just barely clears catch flange 46 at a dial setting of 20,000 feet (and a test-chamber pressure corresponding to atmospheric pressure at 20,000 feet), and (b) the trigger 21 is just clear of catch flange 46 when everything is set for 1,000 feet. Furthermore, it is known that at this time the bellows cap will clear the internal stop at sea level pressure.

It is then also known that everything will be correct not only at sea level, 1,000 feet and 20,000 feet positions of the dial 57, but at all intermediate positions. (It is to be understood that the exact altitudes stated above are exemplary only.)

Further Description of the Bellows and Associated Spring system

In some prior-art aneroid systems in parachute actuators, the aneroids were highly stressed at sea level pressure, because of the evacuated condition of the aneroid and since the aneroids themselves were relied on to start movement of the system at low altitudes. Because of this highly-stressed condition, the aneroids would tend to take a permanent set when shocked. This, in combination with the relatively low stroke, and the adjustment of every aneroid in a production batch to a worst-case aneroid, restricted the accuracy and repeatability of the system and the ability of the system to withstand the drop test (for example).

In accordance with the above-described aspect of the present invention, the full capability of each aneroid is used, there being no necessity to restrict any aneroid to a worst-case aneroid.

Let it be assumed, for example, that it is desired that the spring rate of the aneroid system be 15 pounds/inch. A bellows is then selected that will generate, for example, about 12.5 pounds/inch spring rate. Such bellows is, as stated above, associated with the external spring in such relationship that the external spring tends to elongate the bellows.

In the stated example, the external spring has a spring rate of approximately 2.5 pounds/inch, which adds to the bellows spring rate to create the desired 15 pounds/inch.

However, each bellows has different characteristics. Therefore, the thimble nut 48 is moved along shaft 47 until the effective spring rate of the exterior spring 52 is such that the effective overall spring rate of the system is 15 pounds/inch as desired.

This adjustment serves equally well when the area of the bellows changes between units of a particular production batch of bellows.

It is pointed out that the bellows, by itself, preferably is caused to have a low spring rate, such as the 12.5 pounds/inch. Accordingly, and since the bellows is substantially evacuated, atmospheric pressure at sea level would normally tend to collapse the bellows and cause it to have a permanent set. However, because of the internal stop 41, the bellows cannot thus collapse and therefore does not have a permanent set.

The bellows cap—before spring tension is applied—seats quite firmly on the internal stop in the preferred embodiment, so that a substantial amount of external spring tension is required to pull the cap off the internal stop at sea level pressure. The nut or plug 53 is adjusted to create this relatively large force, so that the bellows cap begins to move away from the internal stop. The bellows cap could be farther off the stop at sea level, but this would make the device less immune to shocks.

The 15 pound/inch spring rate makes the bellows stroke, for example, 0.300 inch between sea level and 20,000 feet. This is much greater than the strokes of conventional aneroids in parachute actuators.

Description of Method and Apparatus for Correlating Dial 57 to Trigger Support Arm 17 in Such Manner as to Match the Spring Rate of the System The method described under the previous subheading, and the method described under the present subheading and the one immediately following, are great improvements over the prior art. For example, it is no longer necessary to use the worst-constructed bellows 36 in a production batch as the standard to which all of the other bellows in such batch must be lowered. In the method described under the previous subheading, the spring rate of the system was adjusted to the dial 57 and associated elements. There will next be described a different method, one by which the dial 57 and associated elements are correlated to the spring rate already present in the system. A first embodiment of such different method (and associated apparatus) will be described under this subheading, while other embodiments will be described under the following subheading.

There will first, however, be described the above-indicated mechanism 19 for associating trigger support arm 17 with altitude cam 18 (and thus with dial 57).

A slide bar 63 having slots 64 in opposite ends thereof is provided as shown in FIGS. 4, 5 and 7. The portions of slide bar 63 adjacent slots 64 ride in annular grooves in nuts 66 that are mounted on the underside of cover 11. There are two such nuts 66, each being held by a screw 67. The relationships are such that slide bar 63 extends transversely of trigger support arm 14; that is to say, substantially parallel to the direction of bellows stroke (reference being made to FIG. 3).

A pin 68 extends through the slide bar 63, the outer end of the pin riding on altitude cam 18. The inner end of pin 68 engages a flange 69 on trigger support arm 17 as shown in FIGS. 4-6, such flange 69 being on the side of such arm 17 that is relatively adjacent bellows 36. A light helical tension spring 71 (FIGS. 2 and 3) is connected between the outer end of trigger support arm 17 and a region of housing 10 that is relatively near the external post 38 for the bellows. Such light spring 71 operates to hold pin 68 against flange 69, and to hold pin 68 against the peripheral edge of altitude cam 18, at all times. In this connection it is to be understood that slots 64 and slide bar 63 are sufficiently long to permit maintenance of the relationship stated in the preceding sentence.

It is pointed out that spring 71 has nothing to do with the overall spring rate of the bellows system, in that spring 71 is associated strictly with trigger support arm 17 and associated parts. The point of connection of the spring 71 to trigger support arm 17 is at an arm extension 72, reference being made to FIGS. 2 and 6.

The shape of the periphery of altitude cam 18 is correlated to the indicia 58 on dial 57, and to the characteristics of bellows 36, and other factors, in a manner which causes the support arm 17 to have a certain pivoted position for each indicia 58 on dial 57, and to permit the bellows to cause catch flange 46 to release trigger 21 for each indicia 58 on dial 57. The relationships are caused to be linear in the preferred form, as described above.

Less preferably, the altitude cam may have a logarithmic spiral; the scale will then be linear though calibrated to 1,000-foot increments of altitude.

In accordance with the first embodiment of the method for correlating the position of dial 57 and associated parts with the overall spring rate of the system, the dial 57, altitude cam 18, and associated pin are moved longitudinally of trigger support arm 17. Stated more definitely, the movement is translatory, not rotational. This provides a changing-lever relationship whereby a given pivotal movement of the dial and altitude cam create progressively varying degrees of pivotal movement of trigger support arm 17.

Figure 12:
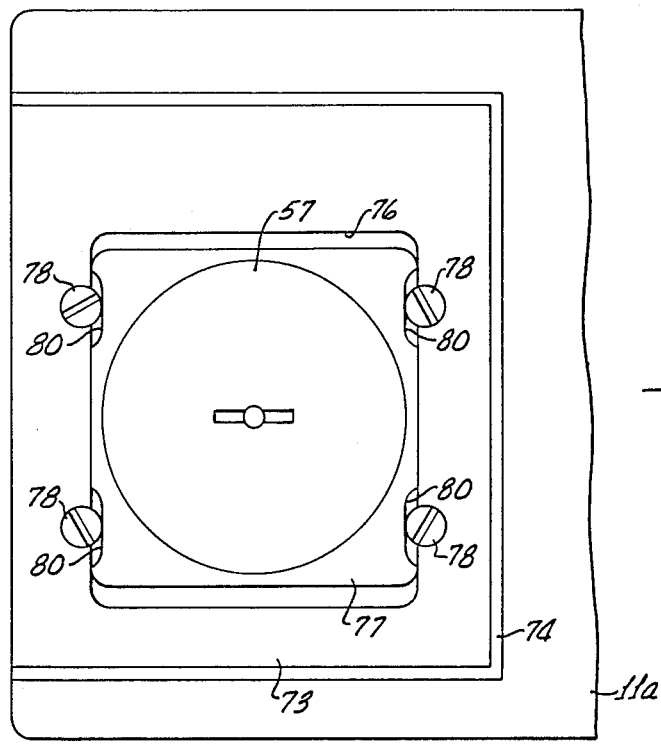
FIG. 12 is a fragmentary top plan view of a second embodiment of the invention, in which means are provided to shift an operating pin along a lever at the factory for calibration purposes, the scale being unshown.
Figure 13:
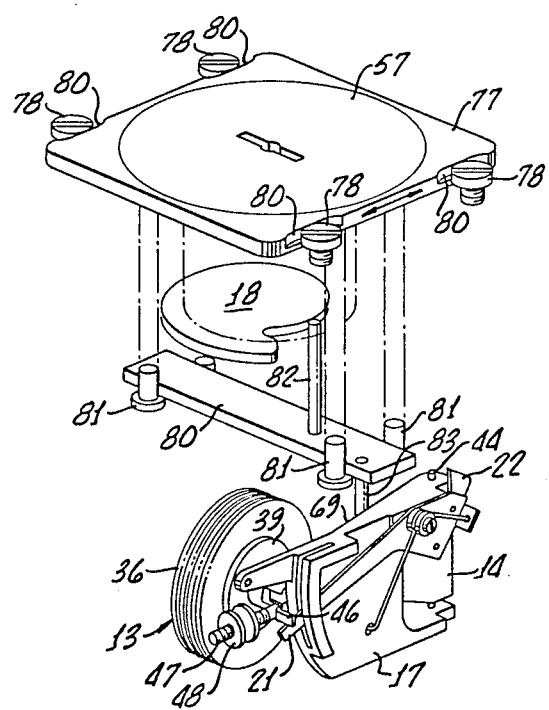
FIG. 13 is an isometric view showing schematically the relationship between the bellows and the calibration or compensation system of such second embodiment.

Referring to FIG. 12, and to schematic FIG. 13, FIG. 12 shows a modified top cover 11a having a raised portion 73. The region that extends down from raised portion 73 to the remainder of top cover 11a is indicated at 74.

Portion 73 has a rectangular opening 76 therein, which receives in sliding relationship a slide plate 77. It is to be understood that portions (not shown) of the top cover extend inwardly for small distances from the periphery of opening 76 so as to support the marginal areas of slide plate 77 in slideable relationship.

As shown in FIG. 13, the orientation of slide plate 77 is such that it may slide longitudinally of trigger support arm 17. After such sliding has occurred, the slide plate 77 is permanently clamped in adjusted position by four screws 78 which are threaded downwardly into cover portion 73. The peripheral regions of the screw heads nest in indented edge regions 80 of the slide plate to effect the clamping relationship.

Rotatably supported in slide plate 77 is a dial 57 which corresponds to dial 57 shown in FIG. 1. The dial 57 of FIGS. 12 and 13 need only have a single marker on it (or more than one marker, one for each barometric pressure within the usual range), and there can be an exterior fixed scale or indicia plate (not shown) which is applied above slide plate 77 in encompassing relationship to 57 after the setting has been made and the screws 78 tightened. Such encompassing scale or indicia plate is marked with one mark for each 1,000 feet of altitude. Preferably, the regions below such indicia plate are filled with epoxy prior to mounting of the encompassing indicia member thereover.

The altitude cam 18 is mounted to the underside of dial 57 by screws, not shown, similarly to the construction shown in FIG. 4. A slide bar 80 is mounted to the underside of slide plate 77 in such a way as to slide at an angle substantially 90 degrees to the direction of adjustment of slide plate 77, namely, substantially perpendicularly to trigger support 17. Four screws 81 extend upwardly adjacent slide bar 80, and into slide plate 77, so as to slideably support the bar 80. A pin 82 extends upwardly from slide bar 80 and engages the periphery of cam 18, while a second pin 83 extends downwardly from a different region of such bar 80 to engage the edge of trigger support arm 17 at flange 69.

Suitable spring means, corresponding generally to spring 71 shown in FIG. 2, keep the arm 17 in contact with pin 83, and keep the pin 82 in contact with the periphery of cam 18.

In practicing a first form of the method relative to the embodiment of FIGS. 12 and 13, let it be assumed that the thimble nut 48 is fixed in position on shaft 47 at all times. In fact, in accordance with this first form of the method there need be no thimble nut 48 but instead a fixed connection from spring 52 to the aneroid lever 14.

Because the slide plate 77 permits the pin 83 to move along the trigger support arm 17, a variable lever relationship is created. In other words, there is permitted a variable ratio between the cam stroke (of cam 18) and the aneroid stroke of aneroid 13.

For example, if the bellows 36 normally strokes 0.400 inch between sea level and 25,000 feet, cam 18 is designed to stroke 0.200 inch (at the 25,000 feet), and the pin 83 is placed one-half of the distance between pivot pin 44 and the axis of the bellows. If (for example) because of the above-stated variations in bellows characteristics, the particular bellows is such that it strokes more than the 0.400 inch in response to the same pressure change (between sea level pressure and that at 25,000 feet), the cam 18 (and thus the associated pin 83 that engages trigger-support arm 17) is moved toward pivot axis or pin 44 for the trigger support arm 17. The amount of such movement is caused to be such that the variations in bellows performance are compensated for.

As a specific example, let it be assumed that the distance between pivot pin 44 and the axis of aneroid 13 is L1, and that the distance between pin 44 and pin 83 is L2. The bellows stroke (0.400 inch) divided by L1 (1.2 inches) should equal cam stroke 0.20 inch) divided by L2. If, in the particular example, the bellows stroke is short, being (for example) 0.380 inch instead of 0.400 inch, then the cam 18 is moved away from pivot pin 44 by a distance such that L2 equals 0.631 inch (0.20 inch multiplied by 1.2 inch divided by 0.380 inch). Since L1 is fixed, while L2 is variable by loosening the screws 78 and sliding slide plate 77, the proper position of the slide plate 77 may be mathematically determined and then checked by actual testing relative to a test chamber.

As in the previous embodiment, the tension spring 52 is employed and the associated cradle element 53 adjusted so that the bellows cap can be calibrated to 1,000 feet.

It is possible to employ both the method described under the preceding subheadings and the method described under this subheading, by adjusting the thimble nut 48 along shaft 47 to achieve a fine adjustment. Prior to doing this, the slide plate 77 is shifted so as to move pin 83 along trigger support arm 17 to achieve a coarse adjustment.

Figure 15:
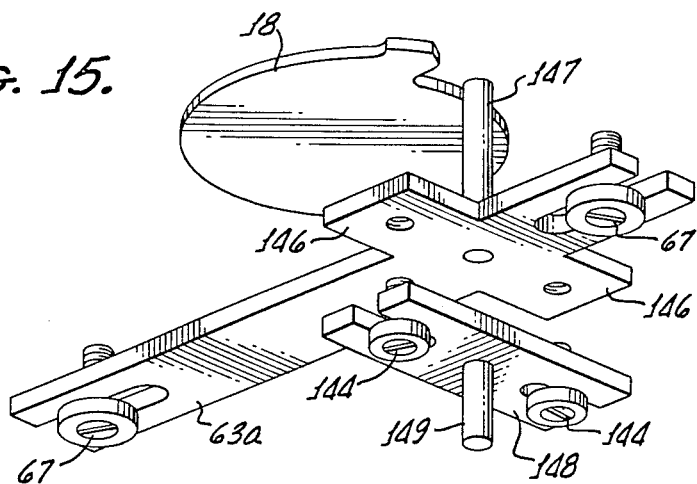
FIGS. 14 and 15 are views that illustrate third and fourth embodiments of the invention.
Figure 14:
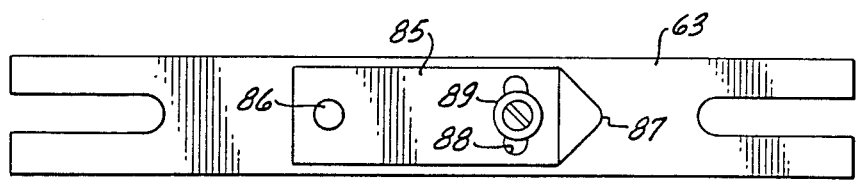

Embodiments of FIGS. 14 and 15

The construction described under the previous subheading relative to slide plate 77 creates a certain amount of added cost, etc. In accordance with the apparatus of FIGS. 14 and 15, this added cost is minimized.

As shown in FIG. 14, the slide bar 63 described relative to the first embodiment (FIGS. 2, 4 and 5), is employed. However, the fixed pin 68 described relative to said figures is not employed. Instead, a bar 85 is mounted longitudinally on the underside of slide bar 63, being pivoted to such bar at a pivot pin 86. Bar 85 extends toward trigger support arm 17. A point 87 is provided on the end of bar 85 remote from pivot 86, and engages the side of trigger support arm 17 (in place of the fixed pin 68).

An arcuate slot 88, having a center at pivot 86, is provided in bar 85, while a screw 89 is extended through such slot and threaded into bar 63. Thus, the position of point 87 can be adjusted by first loosening screw 89, then pivoting bar 85, then tightening the screw 89.

In the described manner, the position of point 87 along bar 63 is controlled in a way which does not change the exterior structure of the top cover of the parachute actuator.

The method is performed relative to the present embodiment the same as relative to the embodiment described under the previous subheading, except that instead of sliding any slid plate (such as 77) and cam (such as 18), the only thing that is moved to shift point 87 along trigger support arm 17 is the arm 85. Referring next to the embodiment of FIG. 15, the bar 63a is identical to bar 63 except that it has crossarms 146. A slide 148 having slotted ends is held by screws 144 to the underside of crossarms 146, since screws 144 thread into bores in such crossarms. Pin 147 on bar 63a rides on cam 18, while pin 149 on slide 148 rides on flange 69 of arm 17.

The pin 149 is adjusted longitudinally of arm 17 by first loosening and then tightening screws 144. The lever arm relationships are thus altered as described above.

Description of Mechanical Switch Mechanism 33, and of Pivot and Cam 23

Referring to FIG. 1, a generally channel-shaped switch guard 90 is mounted on one side wall of housing 10. Extending between the flanges of the switch guard is a pin 91 on which is provided a sleeve 92 having an actuating crank 93 thereon. The outer edge portions of the flanges of switch guard 90 are rounded somewhat, in order to permit objects to move thereby, the relationship being such that such flanges tend to prevent accidental shifting of actuating crank 93.

An eccentric or cam 94 (FIG. 2) is welded to one end of sleeve 92, so as to be rotated in response to shifting of actuating crank 93.

A plunger 96 having an enlarged spring-seat portion 97 is extended slideably through a region 98 of housing 10 as well as through adjacent regions of the housing. Reference is made to FIGS. 2 and 3. There is seated between portion 97 and a region of housing 10 a helical compression spring 99. A seal ring 101 around plunger 96 prevents ingress of dirt and grit into the housing.

The seal 101, and a cylindrical bore in housing portion 98 and in which the above-indicated elements are mounted, are covered by the web of switch guard 90 (which web is secured to the housing by suitable screws, not shown).

Spring 99 biases plunger 96 outwardly, as far as permitted by eccentric 94. Such eccentric has two detent grooves or notches 102,103 therein. Each such groove or notch is adapted to receive the outer and rounded en of plunger 96, this being another factor attempting to hold actuating crank 93 in a predetermined desired position at all times except when intentionally operated by the parachutist.

The parachute actuator is normally strapped to one leg of the person making the jump, in such relationship that an external cylinder 104 (FIG. 8) points upwardly. Such cylinder 104 forms an extension of the housing 10 so as to contain the power spring means 31 in a longer chamber. Assuming that the actuator is thus positioned, upward pivoting of crank 93 effects inward shifting of plunger 97 a predetermined distance, against the bias of spring 99, and cocks the actuator. Detent groove 102 is then registered with and receives the outer plunger end. To arm the s actuator, the crank 93 is pivoted downwardly to a condition (shown in FIG. 8) at which detent groove 103 is registered with the outer plunger end. The opposite sides of the crank 93 are preferably painted different colors (such as red and green), as well as having markings thereon, to fully apprise the parachutist of what condition the actuator is in.

Figure 11:
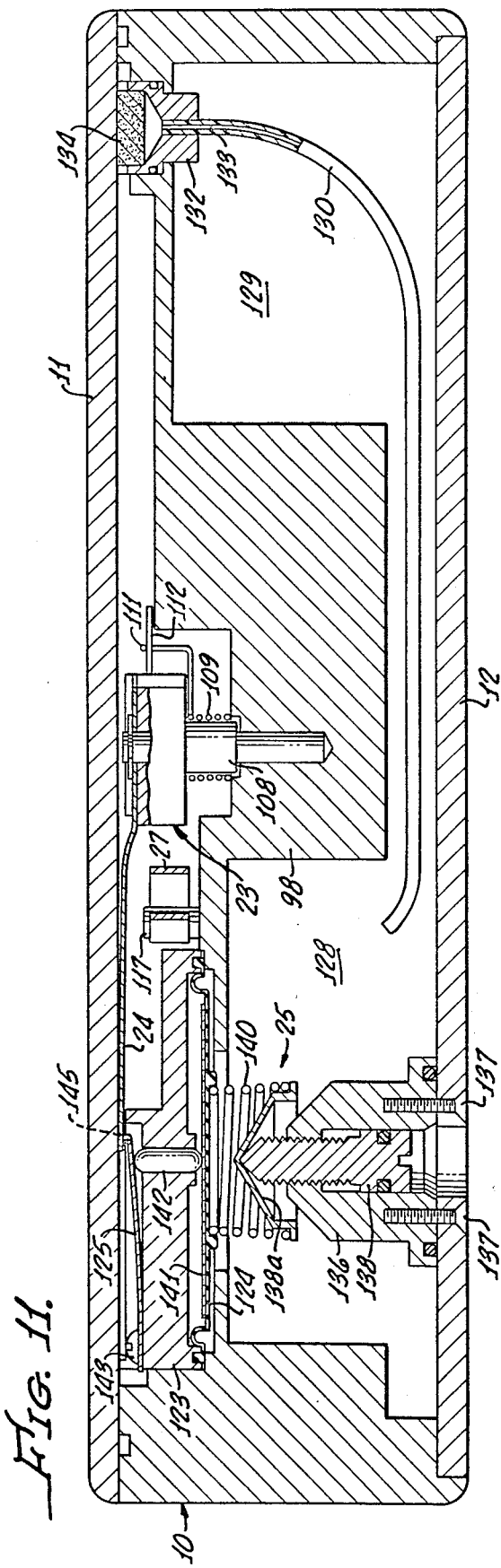
FIG. 11 is a sectional view taken on the broken line 11—11 of FIG. 9, and indicating the rate-of-fall mechanism in a position blocking release of the chute.
Figure 10:
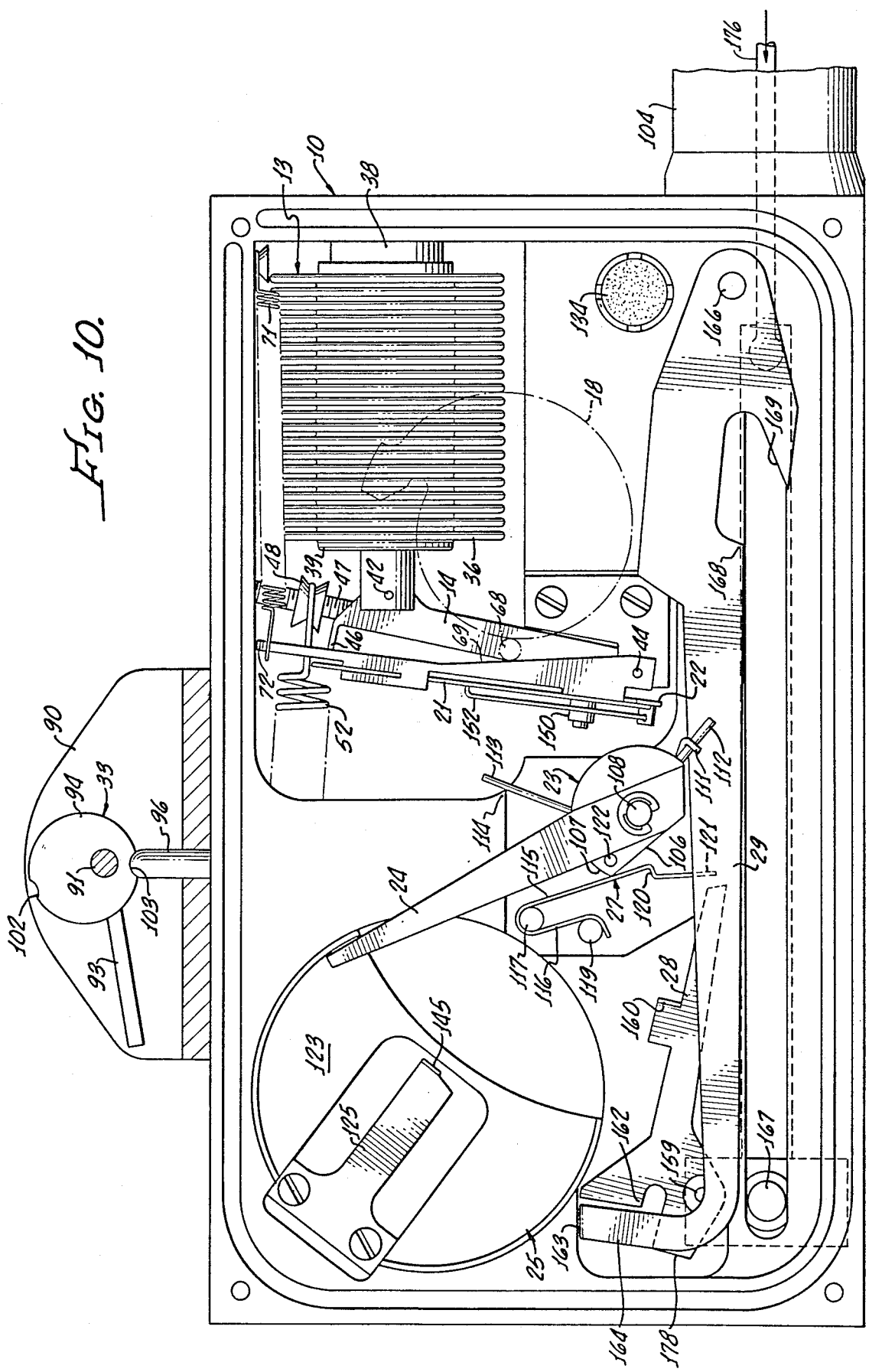
FIG. 10 corresponds to FIG. 9 but illustrates a condition at which the rate of fall is sufficiently great that the chute is permitted to deploy, all latches thus being shown in released condition.

Proceeding next to a description of pivot and cam element 23, this is generally cylindrical except at a flat 106, there being a sharp break between the flat 106 and the cylindrical pivot portion 107 adjacent thereto. A post 108 extends axially of the pivot element 23 and is anchored in housing 10, as shown in FIG. 11. A torsion spring 109 is wound around the post 108 below element 23, and has end portions one of which (number 111) hooks around a radial pin 112 that is anchored in the pivot 23. The other end 113 of the torsion spring is seated against a portion 114 of housing 10 (FIG. 10). Thus, the spring 111 biases pivot element 23 in a clockwise direction as viewed from above.

Figure 8:
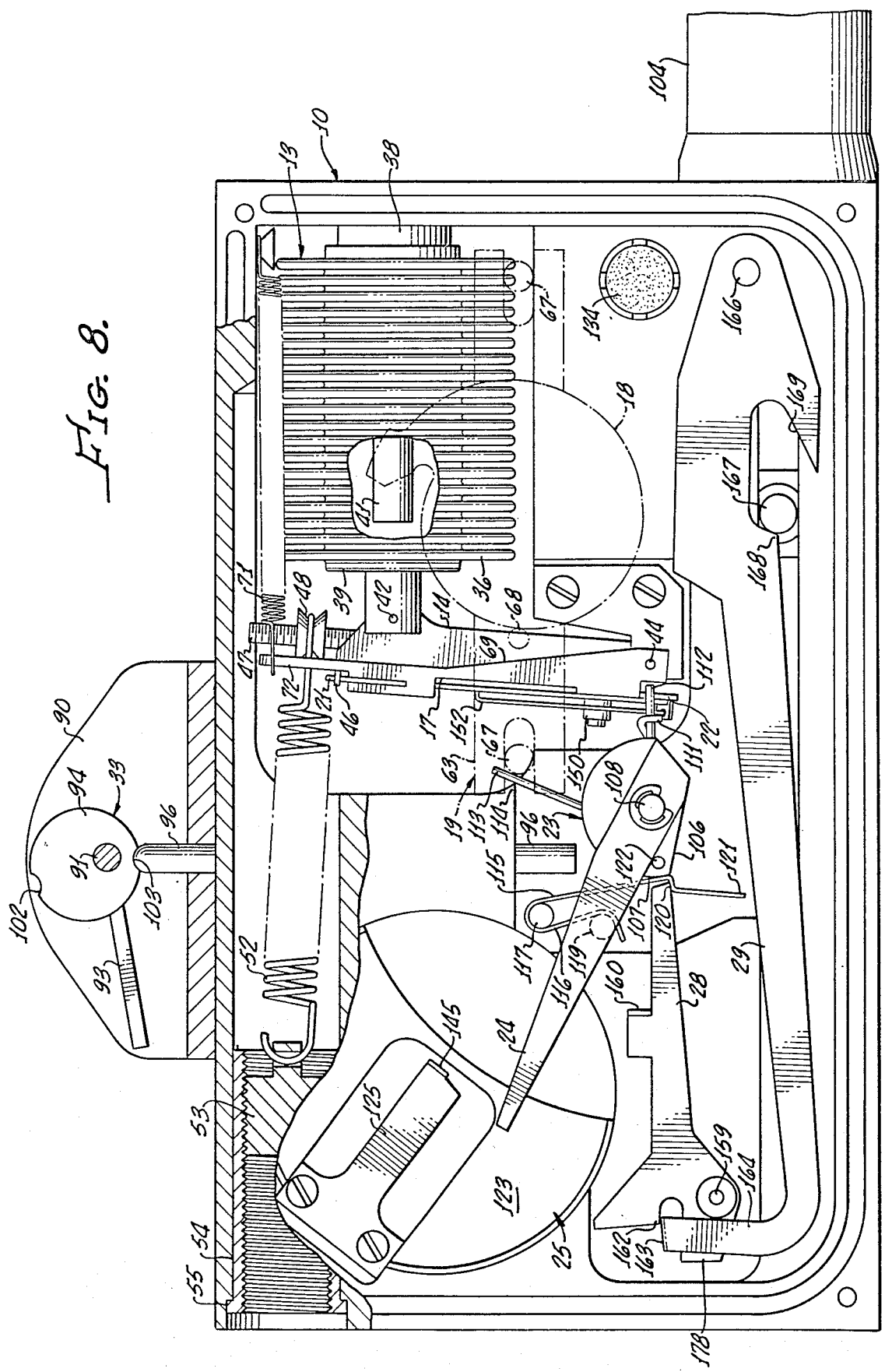
FIG. 8 is a view corresponding to FIG. 3 but illustrating the positions of the parts after the parachute actuator has been armed, the actuator being at such a high altitude that the bellows is expanded and the trigger accordingly being held in place by the bellows mechanism.

The catch lever or spring 27 has two arms 115,116 that are shown in FIG. 8 as converging somewhat towards each other in a direction away from a post 117 (that is anchored in housing 10) around which the spring 27 bends in hairpin relationship. Arm 115 has a bent end portion that is constrained by a second post 119 in housing 10, while arm 116 is constrained by the pivot 23.

The free condition of spring 27 is such that arms 115,116 tend to spring apart. Thus, when pivot 23 is pivoted clockwise to a position at which flat 106 is near arm 115, such arm 115 pivots counterclockwise about post 117 to a position (FIG. 10) at which arms 115,116 are no longer convergent.

Provided integrally at the portion of spring arm 115 adjacent pivot 23 is a catch-region 120 (FIG. 8) that bends at right angles to the spring arm 115. Connected integrally to the left (FIG. 8) end of such catch region 120 is a cam region 121. The upper surface of region 121 is a ramp, such ramp being low at the outer end (bottom of FIG. 8) and high at the catch region 120. The upper end of the ramp has the same elevation as does the upper edge of catch region 120, reference being made to FIG. 2.

A pin 122 (FIGS. 2 and 3) extends downwardly from pivot 23, in direct alignment with plunger 96 so as to be actuated thereby. Pin 122 is spaced a substantial distance outwardly from the central post 108 of the pivot 23.

When actuating crank 93 is shifted clockwise (as viewed from above) to the position shown in FIG. 2, so that plunger 96 is forced a predetermined distance inwardly, the inner plunger end engages pin 122 and pivots the pivot 23 counter-clockwise (as viewed from above). This is the safety position at which the mechanism is cocked but not armed.

When crank 93 is pivoted to the opposite position, plunger 96 moves outwardly to disengage pin 122, so that pivot 23 will then rotate clockwise unless constrained. The distal end of second latch 28 remains seated behind catch region 120, until such time as the mechanism fires and the pivot is no longer constrained. Upon such firing, the pivot 23 rotates clockwise, which permits arm 115 to rotate counterclockwise until the catch region clears the end of second latch 28. As shown in FIG. 10, the second latch 28 then pivot clockwise and releases the main latch 29.

The Rate-of-Fall Mechanism 25

Pivot 23 and catch lever or spring 27 are prevented from shifting to positions at which second latch 28 is no longer held by catch region 120, not only by the pin 122 when the mechanism is in safety condition, but also by the rate-of-fall mechanism 25 (when the actuator is not in free-fall condition), as well as by the trigger mechanism.

The rate-of-fall mechanism 25 is shown in plan in various views, and in vertical section in FIG. 11. The mechanism comprises a generally cylindrical support 123 that nests into a corresponding opening in housing 10, being held in such opening by the cover 11. Support 123 supports a diaphragm 124 on the bottom side thereof; supports a spring 125 on the top side thereof; and supports the distal end of the rate trigger crank or arm 24 on such top side thereof.

The periphery of diaphragm 124 is sealed with the underside of support 123, by a molded bead in the diaphragm, to aid in sealing a chamber that is formed in housing 10 and has two communicating portions 128, 129 (FIG. 11). Chamber 128, 129 is also sealed by sealing means (not shown) a the periphery of bottom cover 12. Thus, the only way that air can enter or leave chamber 128, 129 is through a capillary tube 130 (FIG. 11) that s soldered to a plug 132. There is a small-diameter passage 133 through such tube.

An air filter 134 is provided above plug 132, communicating not only with passage 133 but with the interior of housing 10 at regions outside of chamber 128, 129. Such regions outside of the chamber are in substantially free communication with the ambient atmosphere, by way of filter disc 50 (FIG. 1). Disc 50 is so constructed that the atmospheric pressure on the upper side of filter 134 is substantially identical to ambient atmospheric pressure.

The internal diameter and length of capillary tube 130 are so selected that, when the apparatus is falling slowly, as is the case when the main chute is opened, the pressure in chamber 128, 129 will be relatively close to atmospheric. When, on the other hand, the apparatus is falling rapidly, the parachutist being in free-fall, the pressure in chamber 128, 129 is substantially below atmospheric.

Referring again to FIG. 11, there is sealingly provided in chamber portion 128, on the upper side of bottom cover 12, a rate adjustment screw support 136, there being suitable screws 137 and an 0-ring for this purpose. A rate adjustment screw 138, the head of which is accessible through an opening in bottom cover 12, and which is likewise sealed by an 0-ring, is threaded upwardly through the upper portion of support 136 and engages at its pointed upper end the underside of a cup 138a that supports a helical compression spring 140. The upper end of such spring engages a rubber portion of the underside of diaphragm 124.

A thin steel disc 141 on the upper side of diaphragm 124 engages a slideable pin which extends axially through support 123. The upper, rounded end of pin 142 engages the underside of spring 125 at the distal end of such spring, the base of spring 125 being secured to support 123 by screws 143.

In its normal or free position, spring 125 forces pin 142 downwardly below the position shown in FIG. 11, so that the spring 125 rests flatwise on support 123.

The setting of adjustment screw 138 is such that when the apparatus is in free fall, the pressure differential across diaphragm 124, and tending to force such diaphragm downwardly due to the relatively low pressure in chamber 128, 129, is not overcome by spring 140 and associated elements. Accordingly, pin 142 is then pressed downwardly by spring 125, the latter being a flatwise engagement with support 123 as above noted. When, on the other hand, the main chute is open so that the rate-of-fall is low, the pressure differential across the diaphragm 124 is not great; therefore, the spring 140 and associated elements force diaphragm 124, disc 141, and pin 142 upwardly to lift the distal end of spring 125 as far as permitted by top cover 11.

Referring to FIGS. 2 and 11, a combination catch and ramp 145 is provided at the outer end of spring 125. The shape of such element 145 is such that it has a vertical edge that is relatively adjacent the tip of crank arm 24 on pivot 23 when the pivot is in its safety or unreleased position. Conversely, element 145 has another edge that inclines downwardly away from such vertical edge and constitutes a ramp. The tip of element 24 rides up such ramp and thus passes over element 145 when the pivot 23 and crank or arm 24 pivot counterclockwise as viewed from above.

Crank or arm 24 is a relatively thin, flexible element the base of which is fixedly associated with the upper end of pivot 23, as by being locked in a notched or recessed portion of such upper end. The distal end of crank 24 is sandwiched between the top cover 11 and a table portion of support 123, there being a recessed portion of support 123 between such table portion and the pivot 23. The spring 125 is disposed in a recess in support 123, so that only portion 145 extends above such table portion, and then only when the apparatus is falling slowly as stated above.

The tip of crank 24 is closely contained by the table portion and by the top cover, but nevertheless slides freely at all times unless prevented by the vertical edge of 145.

The upper side of element 25 has a rail about much of its periphery (left side as shown in FIG. 8). Thus, even though support 123 is constrained by cover 11, there is room for crank 24 to move.

Further Description of Latches and Other Elements

Referring first to the trigger latch, as best shown in FIGS. 2, 6 and 7, trigger 21 is a thin, flexible sheet metal element that is pivoted at post 150 to trigger support arm 17. The tip of trigger 21 protrudes past the outer end of support arm 17 for association with catch flange 46 as previously described. In order to be sure that such tip stays precisely in the correct plane, despite the relative thinness of the material forming the trigger, a slot 151 (FIG. 2) is provided in support arm 17 to guide the trigger tip in free-sliding relationship.

A relatively weak spring 152 is mounted on arm 17 and biases trigger 21 in a counterclockwise direction as viewed in FIG. 7. One end of spring 152 is hooked through a hole in arm 17; a central region is bent around post 150; and the remaining spring end is hooked through a hole in a flange 153 on latch (or catch) 22. The latch or catch 22 is a plate that is freely slideable on the underside of a relatively wide base portion of trigger 21, having aligned slots 155 (FIG. 7) that receive pins or rivets 157 (FIG. 6), such pins or rivets extending through the trigger base and through the slots.

The relationships are such that the spring 152 not only biases the trigger counterclockwise as viewed in FIG. 7, but also causes latch or catch 22 to slide to its outermost closed position as viewed in FIG. 7.

When trigger 21 is being held by catch flange 46, the latch or catch 22 protrudes and holds the radial pin 112 which extends from pivot and cam element 23 as previously described. Accordingly, pivot and cam element 23 is prevented from rotating clockwise (as viewed from above) despite the bias of its torsion spring 109. When, on the other hand, the bellows 36 compresses until catch flange 46 no longer holds trigger 21, the pin 112 pushes clockwise past latch or catch 22, the pivot 23 then being released for clockwise rotation.

It is pointed out that the torsion spring 109 associated with pivot 23 is much stronger than is the spring 152 of trigger 21. Accordingly, the pin 112 effects the clockwise pivotal movement of the trigger for release of pin 112, despite the bias of spring 152.

Referring again to FIG. 7, an outer region of latch or catch 22 is rounded to provide a cam region 158 that cooperates with pin 112 of pivot 23 when the mechanism is being cocked by switch mechanism 33. The switch mechanism causes pin 112 to move to the left as viewed in FIG. 7, so that it engages region 158 and cams element 22 downwardly (FIG. 7) despite the bias of spring 152. As soon as pin 112 moves past element 22, the spring 152 causes element 22 to move outwardly, so that a catch edge (at the upper left in FIG. 7) effectively holds the pin 112 until such time as the trigger is released by the aneroid.

Proceeding next to a description of the second latch 28, as shown in FIGS. 2, 3 and 8-10, this is formed of spring metal, as are the trigger 21 and crank or arm 24 of the rate-of-fall device. The second latch is pivoted at 159 to housing 10.

The tip or distal end of the second latch 28 is positioned to ride up the cam or ramp 121 that is provided at the extreme free end of catch lever 27 as described previously. Such riding up occurs when the parachute actuator is cocked. After the distal end of second latch 21 rides up ramp 121, it passes the catch region 120 and then snaps down behind such catch region 120.

In order to be sure that the second latch 28 is not accidentally actuated, as by G forces, a cover-engaging flange 160 is provided integrally at the center of the second latch. Flange 160 extends upwardly and engages top cover 11. Accordingly, when the apparatus is cocked, all of the bending of second latch 28 is in the region between flange 160 and the tip or distal end of the second latch, namely the region to the right of flange 160 as viewed in FIG. 3. It follows that there is a very strong force tending to snap the latch end downwardly behind catch region 120, and preventing the distal end from accidentally popping out from behind such catch region 20 when the G forces are high.

Second latch 28 has a catch region 162 that holds a downwardly-extending flange 163 on an arm 164 of main latch 29, at all times except when the second latch 28 is released. The arm 164 extends over second latch 28 at its pivot 159 and, in combination with the top cover of the device, holds such second latch 28 down so that its pivot does not jump out of a hole or socket therefor despite G forces.

The main latch 29 is a long, strong lever that extends for substantially the full length of housing 10 and is pivoted at 166, near the cylinder 104. When the apparatus is in the cocked position, shown, for example, in FIG. 3, main latch 29 is held in a counterclockwise-pivoted position such that a pin 167 on piston 30 (FIG. 2) is seated on and held by a catch region 168 of the main latch. Pin 167 can slide in a groove in housing 10, when piston 30 is not constrained.

During loading of the power spring means 31, the pin 167 is caused to engage a cam region 169 of the main latch and thus effect counterclockwise pivoting of main latch 29 to the position shown in FIG. 3.

The power spring means 31 is illustrated to comprise three helical compression springs 170-172 (FIG. 2) disposed concentrically within each other around a piston rod 173 that connects to piston 30. These elements are disposed in external cylinder 104 and in a cylindrical bore (FIG. 2) in housing 10. Thus, when the apparatus is cocked, a cable 176 (FIG. 2) connected to rod 173 is pulled, forcing piston 30 to the left, as view in FIG. 2, to load all of the springs against the outer end of external cylinder 104. Such loaded condition is maintained due to the engagement of pin 167 with catch region 168.

Summary of Operation

Let it be assumed that the mechanism is on the ground, being in the fully released condition such as would occur after a jump. This fully released condition is shown in FIG. 10. All of the illustrated latches are pivoted clockwise, while the mechanical switch mechanism 33 is pivoted counterclockwise so that its crank 93 is in the arm position in which it was placed prior to the previous jump.

The parachutist uses a screwdriver or other suitable tool to rotate dial 57 to set the altitude at which it is desired that the reserve chute open. In so doing, the parachutist of course keeps very much in mind the altitude of the ground above sea level. Rotation of dial 57 rotates the altitude cam 18 (FIGS. 3 and 4) to thereby adjust the pivoted position of trigger support arm 17.

The altitude having been set, the parachutist cocks the unit by pivoting crank 93 of switch mechanism 33 clockwise to the position shown in FIG. 3. This operates through eccentric 94 and plunger 96 to pivot the pivot element 23 counterclockwise to the position illustrated. Furthermore, the inner end of plunger 96 remains engaged with pin 122 of pivot element 23, thus ensuring that the device will not fire until arming subsequently occurs.

The counterclockwise movement of the pivot 23 causes crank arm 24 of the rate-of-fall mechanism 25 to cam itself up the ramp of catch and ramp element 145, so that the cocking movement is not impeded by such element 145. The counterclockwise pivot movement also causes pin 112 to cam itself past the cam region 158 of catch or latch 22, despite the bias of spring 152, as described above relative to FIG. 7.

Then, the trigger 21 is in a counterclockwise-pivoted position (FIG. 7) at which it is out of the way of the catch flange 46 of aneroid lever 14. Accordingly, when the parachute is taken up in a plane and the bellows 36 expands, the catch flange 46 pivots to a position at which it will block clockwise pivotal movement of trigger 21 until such time as the bellows again contracts.

The next step is for the parachutist to pull with great force on cable 146, to thereby load the spring means 31 (FIG. 2). This causes pin 167 to move to the right from the position of FIG. 10 to and past that of FIG. 3. The amount of movement past the FIG. 3 position is such as to cause pin 167 to engage cam region 169 and thus effect counterclockwise pivotal movement of main latch 29 about pivot 166.

As main latch 29 pivots counterclockwise, the flange 163 on its arm 164 engages an arm 178 of second latch 28, thereby causing the second latch 28 to pivot counterclockwise from the position of FIG. 10 to that of FIG. 3. In so pivoting, as above described, the distal end of second latch 28 rides up the cam or ramp 121 and snaps over into locked condition behind (counterclockwise of) the catch region 120.

After the second latch has snapped into locked condition behind catch region 120, the parachutist releases the cable so that the power spring means 31 shifts pin 167 to the left in FIG. 3, until the pin engages catch region 168 of main latch 29 and pivots the main latch clockwise. The amount of such pivotal movement is limited by the catch region 163 of second latch 28, the latter catch region now being in position to block shifting of flange 162 of the main latch, despite the strong spring bias.

The parachutist then straps the device to his or her leg, with cylinder 104 pointing upwardly and with cable 176
extending through an armored tube to the ripcord or the parachute, not shown.

After the parachutist is in the air above the pre-set altitude, he or she pivots crank 93 of switch 33 to the position shown in FIG. 8. This is the arm position. The plunger 96 is then allowed to move outwardly in response to the bias of spring 99 (FIGS. 2 and 3), so that the inner end of plunger 96 is spaced away from pin 122 of pivot 23. Thus, the crank 24 of rate-of-fall mechanism 25 pivots clockwise as far as permitted by the trigger 21, acting through pivot 23. Referring to FIG. 2, it is pointed out that pin 112 pivots clockwise. This causes trigger 21 to pivot simultaneously, as far as permitted by catch flange 46. The position of FIG. 8 is thus reached.

Figure 9:
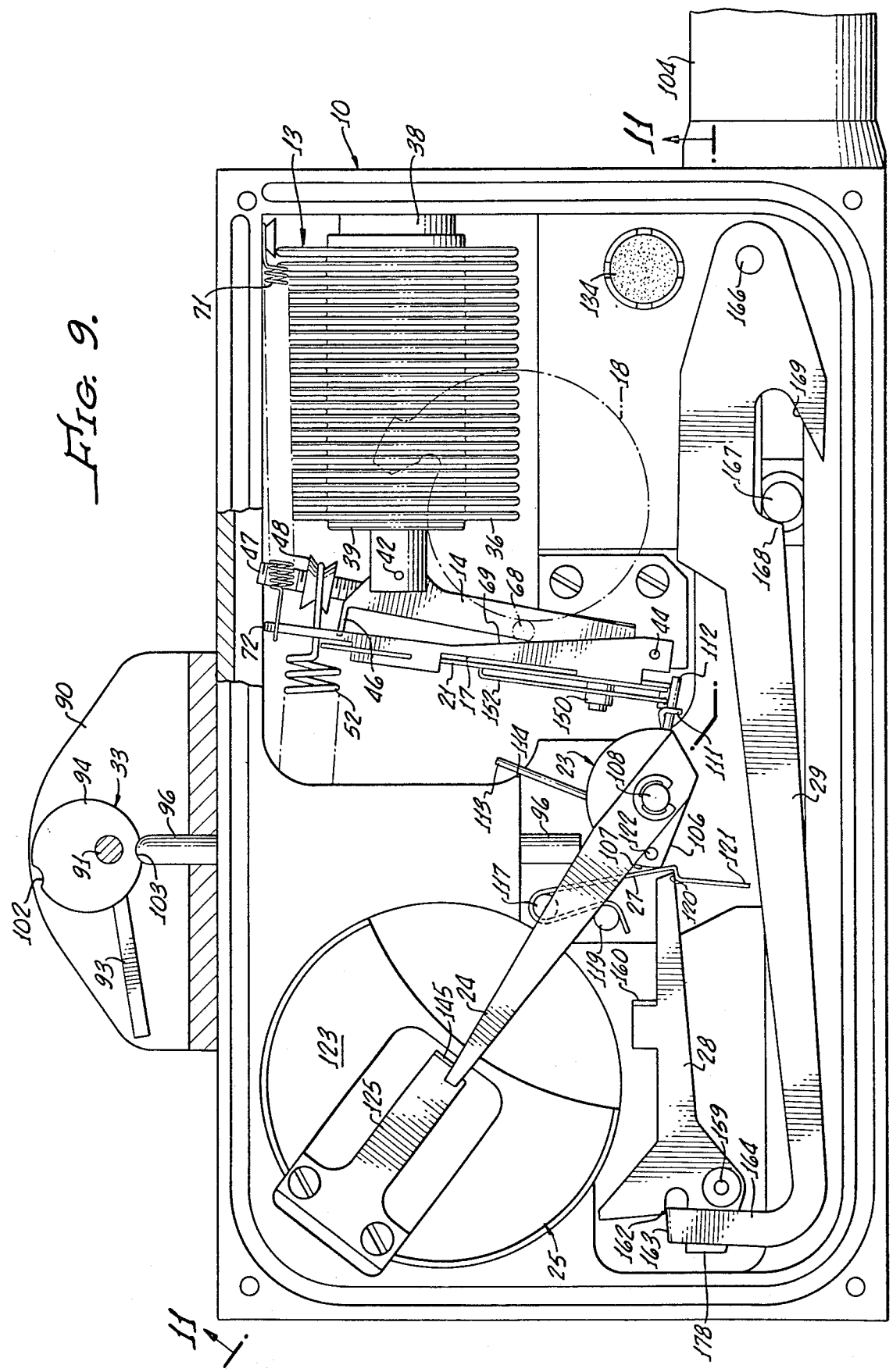
FIG. 9 corresponds to FIG. 8 but illustrates the positions of the parts after the actuator has dropped to the pre-set altitude so that the bellows is compressed and the trigger released, FIG. 9 also showing the condition at which the rate of fall is insufficiently great to permit the chute to deploy.

If, during the jump, the main chute is opened above the pre-set altitude of the present mechanism, the crank 24 will pivot clockwise from the FIG. 8 position to the FIG. 9 position as soon as the device drops to the pre-set altitude. This is because the catch flange 46 moves below trigger 21, releasing the trigger and permitting the pin 112 to move past catch or latch 22 as described previously. Despite such release of the trigger at the set altitude, the arm or crank 24 is caught by catch 145 of mechanism 25 because the low rate of fall does not create a sufficient drop in the pressure in chamber 128,129 (FIG. 11) to permit the upward bias exerted by spring 140 and screw 138 (FIG. 11) to be overcome. Thus, element 145 is pressed against the top cover 11 and the arm 24 cannot get by its vertical face.

It is pointed out that, even when the arm 24 is pivoted clockwise to the position at which it is caught by element 145, the catch lever or spring 27 has not permitted release of second latch 28 and thus main latch 29.

If, on the other hand, the main chute is not opened or does not open, the element 145 of mechanism 25 does not prevent full clockwise movement of arm 24 when the set altitude is reached during the fall, so that all of the parts move to the positions shown in FIG. 10. Thus, when the trigger is released, the arm 24 moves clockwise to the FIG. 10 position, which permits the arm 115 of catch lever or spring 27 to pivot counterclockwise until its catch region 120 is no longer adjacent the tip of second latch 28. Second latch 28 then rotates clockwise under the force of the power spring means 31, which moves catch region 168 of main lever 29 out of the way of pin 167. Then, the spring means 31 immediately unloads and pulls on the rod 173 and cable 176 to open the reserve chute.

The foregoing detailed description is to be clearly understood as given by way of illustration and example only, the spirit and scope of this invention being limited solely by the appended claims.

What is claimed is:

1. A parachute actuator, which comprises:
   (a) power means to deploy a parachute,
   (b) an aneroid system having a spring rate,
   (c) means responsive to operation of said aneroid system (b) to effect actuation of said power means (a) to deploy said parachute,
   (d) a dial having a scale indicating various altitudes at which deployment of said parachute may occur,
      said dial being adapted to be set to effect said deployment of said parachute at various desired altitudes, and
   (e) means to associate said aneroid system (b) with said dial (d), and to relate said aneroid system and said dial to each other in such manner as to correlate said scale to said spring rate of said aneroid system (b),
      said last-named means (e) being operable without changing said spring rate of said aneroid system (B),
      said last-named means (e) operating to cause said scale to indicate accurately the altitude at which parachute deployment will occur so that said dial may be employed to set accurately the altitude at which said parachute deployment will occur.

2. The invention as claimed in claim 1, in which said aneroid system comprises a bellows.

3. The invention as claimed in claim 1, in which said means (e) to associate said aneroid system and said dial and scale includes a cam.

4. The invention as claimed in claim 3, in which said aneroid system (b) is linear, and in which said cam is linear.

5. The invention as claimed in claim 4, in which said scale is logarithmic.

6. A parachute actuator, which comprises:
(a) power means to deploy a parachute,
(b) an aneroid system having a spring rate,
(c) means responsive to operation of said aneroid system (b) to effect actuation of said power means (a) to deploy said parachute,
(d) a dial having a scale indicating various altitudes at which deployment of said parachute may occur, said dial being adapted to be set to effect said deployment of said parachute at various desired altitudes,
(e) means to associate said aneroid system (b) with said dial (d) to thus cause deployment of said parachute to occur at different altitudes depending upon the setting of said dial (d), and
(f) means selectively operable to either increase or decrease the effective spring rate of said aneroid system (b) in such manner as to cause said scale of said dial (d) to indicate accurately, for various settings of said dial (d), the altitude at which said parachute deployment will occur,
said means (f) including spring means external to the aneroid of said aneroid system, and adapted to expand said aneroid.

7. The invention as claimed in claim 6, in which said aneroid system (b) is linear, and in which said means (e) to associate said aneroid system (b) and said dial (d) is linear.

8. The invention as claimed in claim 7, in which said scale of said dial (d) is calibrated in thousands of feet altitude, and is logarithmic.

9. A parachute actuator, comprising:
(a) power means to deploy a parachute,
(b) an aneroid system,
(c) means, including a trigger associated with said aneroid system, to operate said power means to deploy said parachute,
(d) a dial having a scale,
(e) lever means associated with said trigger to determine when said trigger will be operated by said aneroid system,
(f) means responsive to movement of said dial to pivot said lever means and thus change the relationship between said lever means and said aneroid system, and
(g) means to vary operation of said dial movement-response means (f) to correlate said scale of said dial (d) with the altitude at which said power means (a) will effect deployment of said parachute.

10. The invention as claimed in claim 9, in which said aneroid system is a bellows system.

11. The invention as claimed in claim 9, in which said trigger is mounted on said lever means, in which the relationship between said lever means and said aneroid system is such that said trigger pivots farther from or closer to said aneroid system in response to pivoting of said lever means, and in which said means (f) includes an altitude cam associated with said dial.

12. The invention as claimed in claim 9, in which means are provided to vary the effective spring rate of said aneroid system.

13. The invention as claimed in claim 9, in which said means (g) to correlate said scale with the altitude at which said parachute deploys includes means to vary the lever arm relationships in said lever means (e).

14. The invention as claimed in claim 13, in which said means to vary said lever arm relationships includes means to effect translatory movement of said dial.

15. The invention as claimed in claim 13, in which said means to vary said lever arm relationships includes means to move a lever-actuating means along said lever means without effecting translatory movement of said dial.

16. A parachute actuator, which comprises:
(a) power means to deploy a parachute,
(b) an aneroid,
(c) means responsive to the position of said aneroid to operate said power means (a) to deploy said parachute, and
(d) spring means disposed exteriorly of said aneroid and so associated with said aneroid as to create a bias tending to move said aneroid in the direction that said aneroid moves when the ambient pressure decreases.

17. The invention as claimed in claim 16, in which said spring means is at least one helical spring.

18. The invention as claimed in claim 16, in which means are provided to change the force of said spring means, and to change the effective spring rate of said spring means.

19. The invention as claimed in claim 16, in which said aneroid is a bellows, in which said bellows is substantially evacuated, in which said bellows has an internal stop to prevent excessive collapse of said bellows at sea level pressure, and in which means are provided to adjust the force of said external spring means to cause said bellows to be out of contact with said external stop at sea level pressure.

20. The invention as claimed in claim 17, in which said helical spring is a tension spring.

21. A parachute actuator, which comprises:
(a) power means to deploy a parachute,
(b) an aneroid,
(c) means responsive to the condition of said aneroid to effect operation of said power means (a) to deploy said parachute,
(d) a lever arm connected to the movable end of said aneroid, and
(e) spring means provided externally of said aneroid and connected to said lever arm, said spring means being so oriented as to effect a bias on said lever arm tending to lengthen said aneroid.

22. The invention as claimed in claim 21, in which means are provided to change progressively the point at which said spring means is connected to said lever arm, whereby to change progressively the variation in the effective overall spring rate of the system comprising said aneroid and said spring means.

23. The invention as claimed in claim 22, in which means are provided to change the force of said spring means.

24. The invention as claimed in claim 21, in which said spring means is a helical tension spring extending generally longitudinally of said aneroid.

25. A mechanical device for effecting actuation of a parachute, which comprises:
(a) a housing,
(b) power means mounted in said housing and adapted to effect deployment of said parachute upon release of said power means,
(c) an aneroid mounted in said housing,
(d) latch means mounted in said housing and associating said aneroid with said power means to effect release of said power means when said aneroid is in a predetermined condition, (e) a cocking and interlock plunger mounted in said housing and associated with said latch means, said cocking and interlock plunger being adapted to cock at least a portion of said latch means after a jump, said cocking and interlock plunger being movable to an arm position permitting operation of said latch means, and (f) actuating means providing on said housing and operable by the parachutist to move said plunger between cock and arm positions, said last-named means and said plunger not being adapted to be removed from said housing by the parachutist.

26. The invention as claimed in claim 25, in which seal means are provided around said plunger to prevent ingress of dust, grit and dirt into said housing.

27. The invention as claimed in claim 25, in which said last-named means (f) comprises a crank arm pivotally mounted on the exterior of said housing, means to associate said crank arm with said plunger to move said plunger between cocking and arm positions, and spring means to cooperate with said crank arm in effecting said movement.

28. The invention as claimed in claim 27, in which a trigger guard is provided adjacent said crank arm to prevent accidental shifting thereof.

29. The invention as claimed in claim 25, in which said latch means includes a pivot mounted in said housing, and in which said plunger has a portion operatively associated with said pivot to prevent rotation thereof when said plunger is in cock position but to permit rotation thereof when said plunger is in the arm position.

30. An actuator for reserve parachutes, said actuator comprising:

(a) a housing, (b) power means provided in said housing to effect deployment of the reserve parachute upon release of said power means, and (c) rate-of-fall means to prevent operation of said power means to deploy said reserve parachute unless the parachute actuator is in substantially free fall, said rate-of-fall means comprising means to define a sealed chamber in said housing, said rate-of-fall means further comprising means to admit air into said sealed chamber from the ambient atmosphere at a predetermined rate, said predetermined rate being such that the pressure in said sealed chamber becomes substantially less than ambient pressure when said parachute actuator is in free fall condition, said rate-of-fall means further comprising a diaphragm having one side in communication with said sealed chamber, the other side of said diaphragm being in communication with the ambient atmosphere, said rate-of-fall means further comprising biasing means provided to urge said diaphragm in a predetermined direction with sufficient force to overcome the force created by said diaphragm at all times except when the parachute actuator is in free fall condition, said rate-of-fall means further comprising a combination spring, ramp and catch element provided in said housing on the side of said diaphragm remote from said sealed chamber, said combination spring, ramp and catch element being actuated to a relatively elevated position when said actuator is not in free fall condition, but moving back to a relatively low position when said actuator is in free fall condition so that the pressure differential across said diaphragm overcomes the force of said combination spring, ramp and catch element, said rate-of-fall means further comprising an arm or crank adapted to catch on said combination spring, ramp and catch element ss when the same is in elevated condition, and further adapted to prevent operation of said power means to deploy said reserve parachute when said arm or crank is caught on said combination element.

31. The invention as claimed in claim 30, in which a removable top cover is provided on said housing, in which said arm or crank is adjacent said top cover, and in which a catch and ramp portion of said combination spring, ramp and catch element is in engagement with said top cover at all times except when said actuator is in free fall condition.

32. The invention as claimed in claim 30, in which a pivot element is mounted rotatably in said housing, in which spring means are provided to bias said pivot element in a predetermined direction, and in which said arm or crank has a base portion mounted on said pivot element so that said arm or crank is an arm or crank of said pivot element, whereby catching of a distal portion of said arm or crank on said combination spring, ramp and catch element prevent substantial rotation of said pivot means.

33. The invention as claimed in claim 32, in which said pivot element forms a portion of latch means that prevents actuation of said power means to deploy said reserve parachute.

34. A parachute actuating apparatus, which comprises:

(a) a housing, (b) power spring means provided in said housing to release a parachute, (c) an aneroid mounted in said housing, (d) a trigger support arm pivotally mounted to said housing, (e) an aneroid lever pivotally mounted to said housing, said aneroid lever being connected to said aneroid for actuation thereby, (f) a trigger mounted on said trigger support arm, said trigger being adapted to shift to a triggering position unless held by said aneroid lever, (g) a pivot member pivotally mounted in said housing, (h) means to bias said pivot member to effect pivotal movement thereof in a predetermined direction unless said pivot member is constrained against such movement, (i) latch means mounted in said housing to hold said pivot member in a predetermined position, despite said bias, when said trigger is in a predetermined position, (j) a main latch mounted in said housing to hold said power spring means (b) in a position such that it will not release said parachute until operation of said main latch, (k) a second latch controlled by said pivot (g), said second latch being released when said trigger is released, (l) a dial, and associated scale, mounted on said housing for operation by the parachutist, (m) an altitude cam connected to said dial for operation thereby, (n) means operated by said altitude cam to pivot said trigger support arm (d) to various positions in order to set the parachute actuator for release of the parachute at various altitudes, (o) spring means provided in said housing externally of said aneroid, said spring means being connected to said aneroid in such relationship as to tend to cause said aneroid to extend, and (p) means to cause said aneroid and aneroid lever to permit said trigger to shift to triggering position when, and only when, said parachute actuator is substantially at an altitude corresponding to the setting of said dial and scale (1).

35. The invention as claimed in claim 34, in which said last-named means comprises means to vary the effective spring rate of said spring means and to add such a spring rate to the spring rate of said aneroid that the combined spring rate of said spring means and said aneroid matches the setting of said dial and scale.

36. The invention as claimed in claim 34, in which said last-named means comprises means to vary the relationship between said dial and said trigger support arm to thereby match the position of said dial to the spring rate of the aneroid and s external spring system.

37. The invention as claimed in claim 34, in which said spring means is a helical tension spring.

38. The invention as claimed in claim 37, in which means are provided to vary the force of said helical tension spring.

39. The invention as claimed in claim 34, in which said last-named means comprises means operated by said altitude cam to engage said trigger support arm and thus effect pivoting of such arm in response to variations in the setting of said dial, and in which means are provided to move said last-named means progressively along said trigger support arm to vary the lever arm relationships.

40. The invention as claimed in claim 39, in which said means to vary said relationships includes means to effect translatory movement of said dial relative to said housing.

41. The invention as claimed in claim 39, in which said means comprises means interposed between said altitude cam and said trigger support arm to cause said trigger support arm to have different lever arm relationships.

42. The invention as claimed in claim 34, in which said last-named means comprises means to vary the point of connection of said spring means with said aneroid lever.

43. The invention as claimed in claim 34, in which a combination cocking and arming device is provided on said housing, said cocking and arming device always remaining on said housing and having no part thereof adapted to be removed by the parachutist at any time during a jumping cycle, said device being adapted when in one position to prevent movement of said pivot member and when in another position to permit movement of said pivot member, said device being adapted when shifted towards said one position to effect pivoting of said pivot member despite the bias of said bias means (h).

44. The invention as claimed in claim 34, in which additional means are provided to prevent pivotal movement of said pivot member unless a predetermined condition is present.

45. The invention as claimed in claim 44, in which said additional means comprises a rate-of-fall device that prevents pivotal movement of said pivot member to a position effecting release of said second latch unless said parachute actuator is in free-fall condition.

46. The invention as claimed in claim 45, in which said rate-of-fall device includes chamber means provided in said housing, a diaphragm associated with said chamber means and actuated in response to the pressure differential between the pressure in said chamber means and ambient pressure, in which means are provided to bleed air into said chamber means at a predetermined rate, and in which means are provided to operate said rate-of-fall device to a position permitting full operation of said trigger when the pressure in said chamber means becomes low in response to free fall of said parachute actuator.

47. The invention as claimed in claim 34, in which said aneroid is a bellows.

48. A method of achieving a parachute actuator that will effect opening of the parachute very near a pre-set altitude, and that is relatively immune to overstressing of the aneroid due to shock, said method comprising:

(a) providing a parachute actuator having an aneroid therein, (b) applying a spring force to the cap end of said aneroid in such direction as to tend to effect expansion of said aneroid, and (c) varying the amount of said applied spring force.

49. The invention as claimed in claim 48, in which said method further comprises providing a dial on said parachute actuator and providing a scale associated with said dial to indicate altitude settings at various positions of said dial, and performing said varying step (c) in order to cause the effective spring rate of the system to be such that release of the parachute occurs at substantially the altitude indicated by said dial and scale.

50. A method of providing a parachute actuator that is relatively immune to shock and that will effect release of a parachute vary near a pre-set altitude, said method comprising:

(a) providing a bellows having a cap, and having a relatively low spring rate and a relatively long stroke.

(b) providing an internal stop in said bellows to prevent collapse of said bellows to such a condition that it will achieve a set or be damaged, (c) effecting substantial evacuation of said bellows to cause said cap thereof to seat on said internal stop, and (d) providing an external spring to create a force on said bellows directed to pull said cap off said stop, said external spring acting in combination with said bellows to provide an overall spring rate substantially higher than that of said bellows.

51. The invention as claimed in claim 50, in which said last step comprises connecting the cap of said bellows to a lever arm, connecting said spring to said lever arm at a point of connection, and progressively varying said point of connection of said spring to said lever arm.

52. The invention as claimed in claim 50, in which said method further comprises providing a movable trigger support member in such relationship to said bellows that a trigger is released and the parachute deployed when said bellows contracts to a s predetermined point, providing a dial and scale to vary the pivoted position of said trigger support member, and effecting said variation in the effective spring rate of said spring until said scale indicates accurately the altitude at which triggering will occur.

53. A method of providing a parachute actuator having a relatively high immunity to shock, and a high ability to effect release of the parachute at a pre-set altitude, said method comprising:
(a) providing a housing having a dial and scale thereon,
(b) providing an aneroid,
(c) providing a trigger having a support, and
(d) so associating said aneroid and trigger that said aneroid will effect release of said trigger substantially at an altitude setting determined and indicated by said dial and scale,
said last-named step (c) being achieved by creating a variable lever-arm relationship between said dial and said a support for such trigger.

54. The invention as claimed in claim 53, in which said variable lever arm relationship is achieved by effecting translatory movement of said dial and scale along said housing.

55. The invention as claimed in claim 53, in which said variable lever relationship is provided by creating a variable lever relationship between said dial and said support for said trigger.

56. The invention as claimed in claim 53, in which said method further comprises causing said aneroid to be a bellows having a low spring rate and long stroke, and applying a spring force to the cap end of said bellows and in a direction to effect extension of said bellows.

57. A mechanical device for effecting actuation of a parachute, which comprises:
(a) a housing,
(b) power means mounted in said housing and adapted to effect deployment of said parachute upon release of said power means,
(c) an aneroid mounted in said housing,
(d) latch means mounted in said housing and associating said aneroid with said power means to effect release of said power means when said aneroid is in a predetermined condition,
(e) a cocking and interlock element mounted in said housing and associated with said latch means,
said cocking and interlock element being adapted to cock at least a portion of said latch means after a jump,
said cocking and interlock element being movable to an arm position permitting operation of said latch means, and
(f) actuating means provided on said housing and operable by the parachutist to move said cocking and interlock element between cock and arm positions.

said last-named means and said cocking and interlock element not being adapted to be removed from said housing by the parachutist,
said last-named means, when operated by the parachutist to effect cocking effecting movement of said cocking and interlock element through a predetermined distance adapted to cock at least said portion of said latch means.

58. The invention as claimed in claim 57, in which seal means are provided around said cocking and interlock element to prevent ingress of dust, grit and dirt into said housing.

59. The invention as claimed in claim 57, in which said last-named means (f) comprises a crank arm pivotally mounted on the exterior of said housing, means to associate said crank arm with said cocking and interlock element to move said cocking and interlock element a predetermined distance between cocking and arm positions, and spring means to cooperate with said crank arm in effecting said movement.

60. The invention as claimed in claim 59, in which a trigger guard is provided adjacent said crank arm to prevent accidental shifting thereof.

61. The invention as claimed in claim 57, in which said latch means includes a pivot mounted in said housing, and in which said cocking and interlock element has a portion operatively associated with said pivot to prevent rotation thereof when said cocking and interlock element is in cock position but to permit rotation thereof when said cocking and interlock element is in arm position.

62. The invention as claimed in claim 57, in which means are provided to bias said cocking and interlock element outwardly, in which a cam is pivotally mounted on said housing in engagement with the outer end of said cocking and interlock element to limit the extent of outward movement of said cocking and interlock element in response to the bias thereon, said cam having two recesses therein one of which receives said outer end of said cocking and interlock element when said cocking and interlock element is in arm position and the other of which receives said outer end of said cocking and interlock element when said cocking and interlock element is in cock position, said cam being so shaped as to effect inward movement of said cocking and interlock element through a predetermined distance to cock said portion of said latch means when said cam is pivoted between arm position and cock position, and in which means are provided to effect pivoting of said cam.

63. The invention as claimed in claim 62, in which said last-named means comprises a crank on said cam and adapted to be disposed adjacent said housing when said cam is in a position causing said cocking and interlock element to be in arm position, and is also adapted to be adjacent said housing after said cam and crank have rotated to a position at which said cocking and interlock element is in cock position, and in which indicia are provided on said crank on opposite sides thereof to indicate whether said cocking and interlock element is in arm position or cock position.

64. The invention as claimed in claim 50, in which said method further comprises so adjusting said external spring that said cap will be spaced a small distance away from said stop at a predetermined atmospheric pressure corresponding to a relatively low altitude.

* * * * *

UNITED STATES PATENT AND TRADEMARK OFFICE
CERTIFICATE OF CORRECTION

PATENT NO. : 4,865,273

DATED : September 12, 1989

INVENTOR(S) : Leon Jones

It is certified that error appears in the above-identified patent and that said Letters Patent is hereby corrected as shown below:

Claim 9 (column 21, line 50), delete "response" and substitute therefor ---responsive---.

Claim 25 (column 23, line 11), delete "providing" and substitute therefor ---provided---.

Claim 30 (column 24, line 13), delete "ss".

Claim 36 (column 25, line 31), delete "s".

Claim 50 (column 26, line 48), delete "vary" and substitute therefor ---very---.

Claim 50 (column 26, line 52), delete "." and substitute therefor ---,---.

Claim 52 (column 27, line 5), delete "s".

Signed and Sealed this

Twenty-eighth Day of April, 1992

Attest:

HARRY F. MANBECK, JR.

*Attesting Officer*   *Commissioner of Patents and Trademarks*